United States Patent
Tyan et al.

(10) Patent No.: US 10,220,881 B2
(45) Date of Patent: Mar. 5, 2019

(54) CELLULAR STRUCTURES WITH FOURTEEN-CORNERED CELLS

(71) Applicant: FORD GLOBAL TECHNOLOGIES, LLC, Dearborn, MI (US)

(72) Inventors: Tau Tyan, Northville, MI (US); Yu-Kan Hu, Ypsilanti, MI (US); Leonard Anthony Shaner, New Baltimore, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/248,136

(22) Filed: Aug. 26, 2016

(65) Prior Publication Data
US 2018/0057060 A1   Mar. 1, 2018

(51) Int. Cl.
| | |
|---|---|
| *B62D 21/15* | (2006.01) |
| *B32B 3/12* | (2006.01) |
| *B62D 25/02* | (2006.01) |
| *B62D 29/00* | (2006.01) |

(52) U.S. Cl.
CPC .............. *B62D 21/15* (2013.01); *B32B 3/12* (2013.01); *B62D 25/025* (2013.01); *B62D 29/008* (2013.01); *B32B 2250/03* (2013.01); *B32B 2250/40* (2013.01); *B32B 2605/00* (2013.01)

(58) Field of Classification Search
CPC .... B62D 21/15; B62D 29/008; B62D 25/025; B32B 3/12; B32B 2250/40; B32B 2250/03; B32B 2605/00
See application file for complete search history.

(56) References Cited

U.S. PATENT DOCUMENTS

| | | | |
|---|---|---|---|
| 2,205,893 | A | 6/1840 | Unger |
| 1,951,292 | A | 3/1934 | Cahill |
| 2,340,003 | A | 1/1944 | McDermot |
| 2,837,347 | A | 6/1958 | Barenyi |
| 2,856,226 | A | 10/1958 | Purdy |
| 3,092,222 | A | 6/1963 | Heinle |
| 3,209,432 | A | 10/1965 | Cape |
| 3,366,530 | A | 1/1968 | Kodich |
| 3,412,628 | A | 11/1968 | De Gain |
| 3,930,658 | A | 1/1976 | Howe et al. |

(Continued)

FOREIGN PATENT DOCUMENTS

| | | |
|---|---|---|
| CN | 104443039 A | 3/2015 |
| CN | 104763772 A | 7/2015 |

(Continued)

OTHER PUBLICATIONS

Machine translation for JP08-337183.

(Continued)

*Primary Examiner* — D Glenn Dayoan
*Assistant Examiner* — Melissa A Black
(74) *Attorney, Agent, or Firm* — Jones Robb, PLLC; Jason Rogers

(57) ABSTRACT

A cellular structure may include a plurality of cells each cell of the plurality of cells having a fourteen-cornered cross section. The fourteen-cornered cross section may include fourteen sides and fourteen corners. Each cell may include a plurality of longitudinal walls extending between a top and a bottom of the cell, the longitudinal walls intersecting to create corners of the cell.

69 Claims, 22 Drawing Sheets

(56) References Cited

U.S. PATENT DOCUMENTS

| | | |
|---|---|---|
| 3,964,527 A | 6/1976 | Zwart |
| 4,018,055 A | 4/1977 | Clercq |
| 4,021,983 A | 5/1977 | Kirk, Jr. |
| 4,029,350 A | 6/1977 | Goupy et al. |
| 4,056,878 A | 11/1977 | Woodley |
| 4,227,593 A | 10/1980 | Bricmont et al. |
| 4,249,976 A | 2/1981 | Hudson |
| 4,352,484 A | 10/1982 | Gertz et al. |
| 4,364,216 A | 12/1982 | Koller |
| 4,667,530 A | 5/1987 | Mettler et al. |
| 4,702,515 A | 10/1987 | Kato et al. |
| 5,069,318 A | 12/1991 | Kulesha et al. |
| 5,100,730 A | 3/1992 | Lambers |
| 5,242,735 A | 9/1993 | Blankenburg et al. |
| 5,271,204 A | 12/1993 | Wolf et al. |
| 5,431,445 A | 7/1995 | Wheatley |
| 5,480,189 A | 2/1996 | Schechter |
| 5,618,633 A | 4/1997 | Swanson et al. |
| 5,729,463 A | 3/1998 | Koenig et al. |
| 5,913,565 A | 6/1999 | Watanabe |
| 6,068,330 A | 5/2000 | Kasuga et al. |
| 6,179,355 B1 | 1/2001 | Chou et al. |
| 6,371,540 B1 | 4/2002 | Campanella et al. |
| 6,523,576 B2 | 2/2003 | Imaeda et al. |
| 6,588,830 B1 | 7/2003 | Schmidt et al. |
| 6,635,202 B1 | 10/2003 | Bugg et al. |
| 6,705,653 B2 | 3/2004 | Gotanda et al. |
| 6,752,451 B2 | 6/2004 | Sakamoto et al. |
| 6,799,794 B2 | 10/2004 | Mochidome et al. |
| 6,893,065 B2 | 3/2005 | Seksaria et al. |
| 6,959,894 B2 | 11/2005 | Hayashi |
| 7,044,515 B2 | 5/2006 | Mooijman et al. |
| 7,160,621 B2 | 1/2007 | Chaudhari et al. |
| 7,252,314 B2 | 8/2007 | Tamura et al. |
| 7,264,274 B2 | 9/2007 | Ridgway |
| 7,303,219 B2 | 12/2007 | Trabant et al. |
| 7,350,851 B2 | 4/2008 | Barvosa-Carter et al. |
| 7,357,445 B2 | 4/2008 | Gross et al. |
| 7,407,219 B2 | 8/2008 | Glasgow et al. |
| 7,445,097 B2 | 11/2008 | Tamura et al. |
| 7,678,440 B1 | 3/2010 | McKnight et al. |
| 7,896,411 B2 | 3/2011 | Kano et al. |
| 7,926,160 B2 | 4/2011 | Zifferer et al. |
| 7,926,865 B2 | 4/2011 | Terada et al. |
| 7,988,809 B2 | 8/2011 | Smith et al. |
| 8,336,933 B2 | 12/2012 | Nagwanshi et al. |
| 8,354,175 B2 | 1/2013 | Impero |
| 8,438,808 B2 | 5/2013 | Carlson et al. |
| 8,459,726 B2 | 6/2013 | Tyan et al. |
| 8,469,416 B2 | 6/2013 | Haneda et al. |
| 8,539,737 B2 | 9/2013 | Tyan et al. |
| 8,573,571 B2 | 11/2013 | Langhorst et al. |
| 8,641,129 B2 | 2/2014 | Tyan et al. |
| 8,659,659 B2 | 2/2014 | Bradai et al. |
| 9,073,582 B2 | 7/2015 | Tyan et al. |
| 9,174,678 B2 | 11/2015 | Tyan et al. |
| 9,187,127 B2 | 11/2015 | Tyan et al. |
| 9,365,245 B2 | 6/2016 | Donabedian et al. |
| 9,533,710 B2 | 1/2017 | Cheng et al. |
| 9,789,906 B1 | 10/2017 | Tyan |
| 9,840,281 B2 | 12/2017 | Tyan et al. |
| 9,845,112 B2 | 12/2017 | Tyan et al. |
| 9,889,887 B2 | 2/2018 | Tyan et al. |
| 9,944,323 B2 | 4/2018 | Tyan et al. |
| 2002/0059087 A1 | 5/2002 | Wahlbin et al. |
| 2002/0153719 A1 | 10/2002 | Taguchi |
| 2003/0085592 A1 | 5/2003 | Seksaria et al. |
| 2005/0028710 A1 | 2/2005 | Carpenter et al. |
| 2006/0033363 A1 | 2/2006 | Hillekes et al. |
| 2006/0181072 A1 | 8/2006 | Tamura et al. |
| 2006/0202493 A1 | 9/2006 | Tamura et al. |
| 2006/0202511 A1 | 9/2006 | Tamura et al. |
| 2006/0249342 A1 | 9/2006 | Canot et al. |
| 2007/0056819 A1 | 3/2007 | Kano et al. |
| 2007/0114804 A1 | 5/2007 | Gross et al. |
| 2008/0012386 A1 | 1/2008 | Kano et al. |
| 2008/0014809 A1 | 1/2008 | Brown et al. |
| 2008/0030031 A1 | 2/2008 | Nilsson et al. |
| 2008/0036242 A1 | 2/2008 | Glance et al. |
| 2008/0098601 A1 | 5/2008 | Heinz et al. |
| 2008/0106107 A1 | 5/2008 | Tan et al. |
| 2008/0164864 A1 | 7/2008 | Bjorn |
| 2008/0185852 A1 | 9/2008 | Suzuki et al. |
| 2008/0217935 A1 | 9/2008 | Braunbeck et al. |
| 2009/0026777 A1 | 1/2009 | Schmid et al. |
| 2009/0085362 A1 | 4/2009 | Terada et al. |
| 2009/0092820 A1 | 4/2009 | Lambers |
| 2009/0102234 A1 | 4/2009 | Heatherington et al. |
| 2009/0174219 A1 | 7/2009 | Foreman |
| 2009/0236166 A1 | 9/2009 | Kowaki et al. |
| 2010/0064946 A1 | 3/2010 | Watson |
| 2010/0066124 A1 | 3/2010 | Terada et al. |
| 2010/0072788 A1 | 3/2010 | Tyan et al. |
| 2010/0102592 A1 | 4/2010 | Tyan et al. |
| 2010/0164238 A1 | 7/2010 | Nakanishi et al. |
| 2011/0012389 A1 | 1/2011 | Kanaya et al. |
| 2011/0015902 A1 | 1/2011 | Cheng et al. |
| 2011/0024250 A1 | 2/2011 | Kitashiba et al. |
| 2011/0102592 A1 | 5/2011 | Bradai et al. |
| 2011/0187135 A1 | 8/2011 | Kano et al. |
| 2011/0223372 A1 | 9/2011 | Metz et al. |
| 2011/0226312 A1 | 9/2011 | Bohm et al. |
| 2012/0205927 A1 | 8/2012 | Asakawa et al. |
| 2012/0261949 A1 | 10/2012 | Tyan et al. |
| 2013/0140850 A1 | 6/2013 | Tyan et al. |
| 2013/0193699 A1 | 8/2013 | Zannier |
| 2013/0221692 A1 | 8/2013 | Wang et al. |
| 2013/0264757 A1 | 10/2013 | Rajasekaran et al. |
| 2013/0292968 A1 | 11/2013 | Tyan et al. |
| 2013/0300138 A1 | 11/2013 | Banasiak et al. |
| 2013/0341115 A1 | 12/2013 | Tyan et al. |
| 2014/0021709 A1 | 1/2014 | Hirose et al. |
| 2014/0127454 A1 | 5/2014 | Kuppers |
| 2014/0203577 A1 | 7/2014 | Nagwanshi et al. |
| 2014/0261949 A1 | 9/2014 | Marella et al. |
| 2014/0353990 A1 | 12/2014 | Ishitobi et al. |
| 2015/0001866 A1 | 1/2015 | Noyori |
| 2015/0084374 A1 | 3/2015 | Tyan et al. |
| 2015/0197206 A1 | 7/2015 | Tamura et al. |
| 2015/0247298 A1 | 9/2015 | Li et al. |
| 2015/0314743 A1 | 11/2015 | Matsushiro |
| 2016/0001725 A1 | 1/2016 | Nakanishi et al. |
| 2016/0001726 A1 | 1/2016 | Keller et al. |
| 2016/0052557 A1 | 2/2016 | Tyan et al. |
| 2016/0068194 A1 | 3/2016 | Tyan et al. |
| 2016/0129866 A1 | 5/2016 | Kamiya |
| 2016/0221521 A1 | 8/2016 | Nishimura et al. |
| 2016/0264083 A1 | 9/2016 | Ishitsuka |
| 2016/0332410 A1* | 11/2016 | Brun .................. B32B 5/26 |
| 2016/0375935 A1 | 12/2016 | Tyan et al. |
| 2017/0106915 A1 | 4/2017 | Tyan et al. |
| 2017/0113724 A1 | 4/2017 | Tyan et al. |
| 2017/0203790 A1 | 7/2017 | Tyan et al. |
| 2017/0274933 A1 | 9/2017 | Tyan |
| 2017/0307137 A1 | 10/2017 | Tyan et al. |
| 2017/0307138 A1 | 10/2017 | Tyan |
| 2018/0057058 A1 | 3/2018 | Tyan |
| 2018/0057063 A1 | 3/2018 | Tyan et al. |
| 2018/0058530 A1 | 3/2018 | Tyan |
| 2018/0099475 A1 | 4/2018 | Tyan et al. |
| 2018/0099696 A1 | 4/2018 | Tyan et al. |
| 2018/0100621 A1 | 4/2018 | Tyan et al. |

FOREIGN PATENT DOCUMENTS

| | | |
|---|---|---|
| CN | 104890308 A | 9/2015 |
| CN | 105235616 A | 1/2016 |
| DE | 102005037055 A1 | 2/2007 |
| DE | 102009035782 A1 | 3/2010 |
| EP | 0856681 A1 | 8/1998 |
| FR | 2375496 A2 | 7/1978 |
| GB | 1123337 A | 8/1968 |
| JP | 08-337183 | 12/1996 |
| JP | 3897542 B2 | 1/2007 |

(56) References Cited

FOREIGN PATENT DOCUMENTS

| | | |
|---|---|---|
| JP | 200723661 A | 2/2007 |
| JP | 2008168745 A | 7/2008 |
| JP | 2008261493 A | 10/2008 |
| JP | 2009184417 A | 8/2009 |
| JP | 04-371059 | 11/2009 |
| JP | 2011051581 A | 3/2011 |
| JP | 2012107660 A | 6/2012 |
| JP | 5348910 B2 | 8/2013 |
| JP | 2013159132 A | 8/2013 |
| JP | 2014004973 A | 1/2014 |
| JP | 2015124784 A | 7/2015 |
| RU | 2246646 C2 | 10/2004 |
| WO | 92/09766 A1 | 6/1992 |

OTHER PUBLICATIONS

Yoshiaka Nakazawa et al., "Development of Crash-Box for Passenger Car With High Capability for Energy Absorption", VIII International Conference on Computation Plasticity (COMPLAS VIII), Barcelona, 2005.
Ali Najafi et al., "Mechanics of Axial Plastic Collapse in Multi-Cell, Multi-Corner Crush Tubes," sciencedirect.com, Sep. 1, 2010.
Xiong Zhang et al., "Crushing Analysis of Polygonal Columns and Angle Elements," sciencedirect.com, Jun. 27, 2009.
Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.
Fyllingen et al., "Simulations of a Top-Hat Section Subjected to Axial Crushing Taking Into Account Material and Geometry Variations," sciencedirect.com, Jul. 31, 2008.
Minoru Yamashita et al., "Quasi-Static and Dynamic Axial Crushing of Various Polygonal Tubes," sciencedirect.com, Jun. 2007.
Comparison of Energy Absorption of Various Section Steel Tubes under Axial Compression and Bending Loading, The 21st Conference of Mechanical Engineering network of Thailand, Oct. 19, 2007. p. 590-593. (See IDS of Sep. 23, 2014 for U.S. Appl. No. 12/891,801).
Mar. 17, 2016 PABR in Response to NFOA dated Dec. 17, 2015 from U.S. Appl. No. 12/891,801.
Office Action dated Aug. 17, 2012 from U.S. Appl. No. 13/087,663.
Nov. 16, 2012 Response to Office Action dated Aug. 17, 2012 from U.S. Appl. No. 13/087,663.
Office Action dated Mar. 2, 2015 from U.S. Appl. No. 14/010,115.
Office Action dated Mar. 16, 2015 from U.S. Appl. No. 14/010,115.
Office Action dated Sep. 15, 2014 from U.S. Appl. No. 13/902,116.
Dec. 12, 2014 Response to Office Action dated Sep. 15, 2014 from U.S. Appl. No. 13/902,116.
Office Action dated Aug. 19, 2011 from U.S. Appl. No. 12/233,808.
Nov. 15, 2011 Response to Office Action dated Aug. 19, 2011 from patented U.S. Appl. No. 12/233,808.
Office Action dated Mar. 7, 2012 from U.S. Appl. No. 12/233,808.
Jun. 6, 2012 Response to Office Action dated Mar. 7, 2012 from patented U.S. Appl. No. 12/233,808.
Office Action dated Jul. 31, 2012 from U.S. Appl. No. 12/233,808.
Oct. 31, 2012 Response to Office Action dated Jul. 31, 2012 from U.S. Appl. No. 12/233,808.
Office Action dated Feb. 27, 2013 from U.S. Appl. No. 12/233,808.
Apr. 29, 2013 Response to Office Action dated Feb. 27, 2013 from U.S. Appl. No. 12/233,808.
Office Action dated Jul. 20, 2012 from U.S. Appl. No. 12/651,614.
Oct. 22, 2012 Response to Office Action dated Jul. 20, 2012 from U.S. Appl. No. 12/651,614.
Office Action dated Feb. 21, 2013 from co-pending U.S. Appl. No. 12/651,614.
Apr. 22, 2013 Response to Office Action dated Feb. 21, 2013 from U.S. Appl. No. 12/651,614.
Advisory Action dated May 6, 2013 from co-pending U.S. Appl. No. 12/651,614.
Office Action dated Jun. 6, 2013 from U.S. Appl. No. 12/651,614.
Sep. 5, 2013 Response to Office Action dated Jun. 6, 2013 from U.S. Appl. No. 12/651,614.
Office Action dated Jun. 28, 2013 from U.S. Appl. No. 12/891,801.
Sep. 27, 2013 Response to Office Action dated Jun. 28, 2013 from U.S. Appl. No. 12/891,801.
Office Action dated Jan. 16, 2014 from U.S. Appl. No. 12/891,801.
Mar. 18, 2014 Response to Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
May 21, 2013 Response to Office Action dated Feb. 21, 2013 from U.S. Appl. No. 12/651,614.
Office Action dated Jul. 18, 2014 from U.S. Appl. No. 14/010,115.
Oct. 20, 2014 Response to Office Action dated Jul. 18, 2014 from U.S. Appl. No. 14/010,115.
Office Action dated Jan. 3, 2014 from U.S. Appl. No. 14/010,115.
Apr. 3, 2014 Response to Office Action dated Jan. 3, 2014 from U.S. Appl. No. 14/010,115.
Office Action dated Dec. 17, 2015 from U.S. Appl. No. 12/891,801.
Non-Final Office Action dated Mar. 27, 2018 from co-pending U.S. Appl. No. 14/749,426.
Extended European Search Report for Application No. 15195185.2, dated May 19, 2016.
Non-Final Office Action dated Feb. 22, 2017 from U.S. Appl. No. 15/078,517.
Notice of Allowance dated Jun. 5, 2017 from U.S. Appl. No. 15/078,517.
Non-Final Office Action dated Mar. 17, 2017 from U.S. Appl. No. 14/749,426.
Non-Final Office Action dated Feb. 7, 2017 from U.S. Appl. No. 14/923,802.
Non-Final Office Action dated Mar. 20, 2017 from U.S. Appl. No. 15/001,668.
Non-Final Office Action dated Nov. 1, 2016 from U.S. Appl. No. 14/930,299.
Final Office Action dated May 16, 2017 from U.S. Appl. No. 14/930,299.
Non-Final Office Action dated Jan. 23, 2017 from U.S. Appl. No. 14/942,385.
Final Office Action dated May 15, 2017 from U.S. Appl. No. 14/942,385.
Final Office Action dated Jul. 10, 2017 from U.S. Appl. No. 14/749,426.
Notice of Allowance dated Aug. 4, 2017 from U.S. Appl. No. 14/942,385.
Final Office Action dated Aug. 25, 2017 from U.S. Appl. No. 14/923,802.
Notice of Allowance dated Aug. 10, 2017 from U.S. Appl. No. 14/930,299.
Notice of Allowance dated Oct. 4, 2017 from U.S. Appl. No. 15/001,668.
Final Office Action dated Dec. 12, 2017 from U.S. Appl. No. 14/749,426.
Non-Final Office Action dated Feb. 12, 2018 from U.S. Appl. No. 15/395,524.
Notice of Allowance dated Dec. 4, 2017 from U.S. Appl. No. 14/923,802.
Non-Final Office Action dated Jun. 12, 2018 from related U.S. Appl. No. 15/251,099.
Non-Final Office Action dated Jun. 22, 2018 from related U.S. Appl. No. 15/244,450.
Non-Final Office Action dated Jul. 24, 2018, from related U.S. Appl. No. 15/138,466.
Non-Final Office Action dated Jul. 27, 2018, from related U.S. Appl. No. 14/749,426.
Final Office Action dated Aug. 31, 2018, from related U.S. Appl. No. 15/395,524.

* cited by examiner

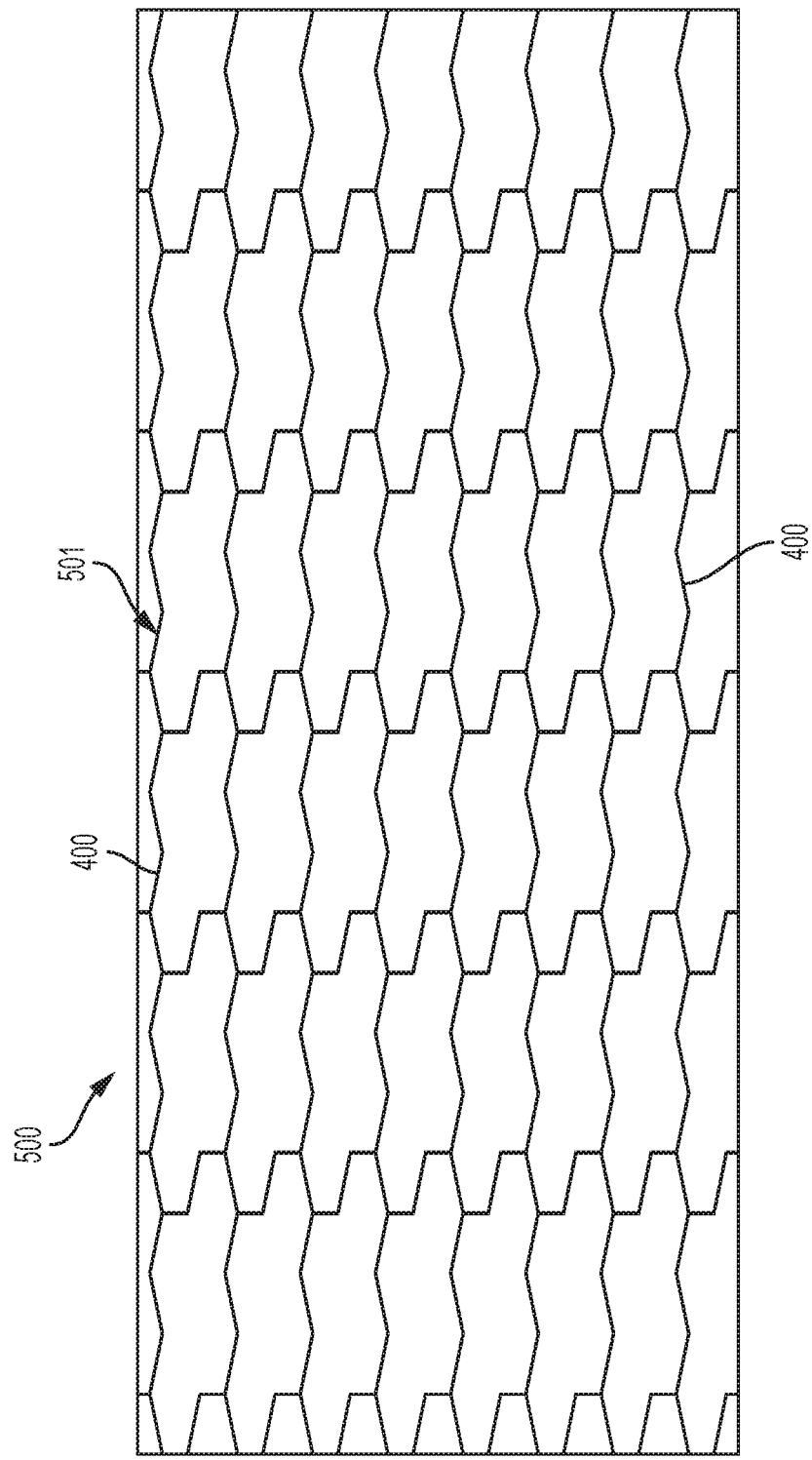

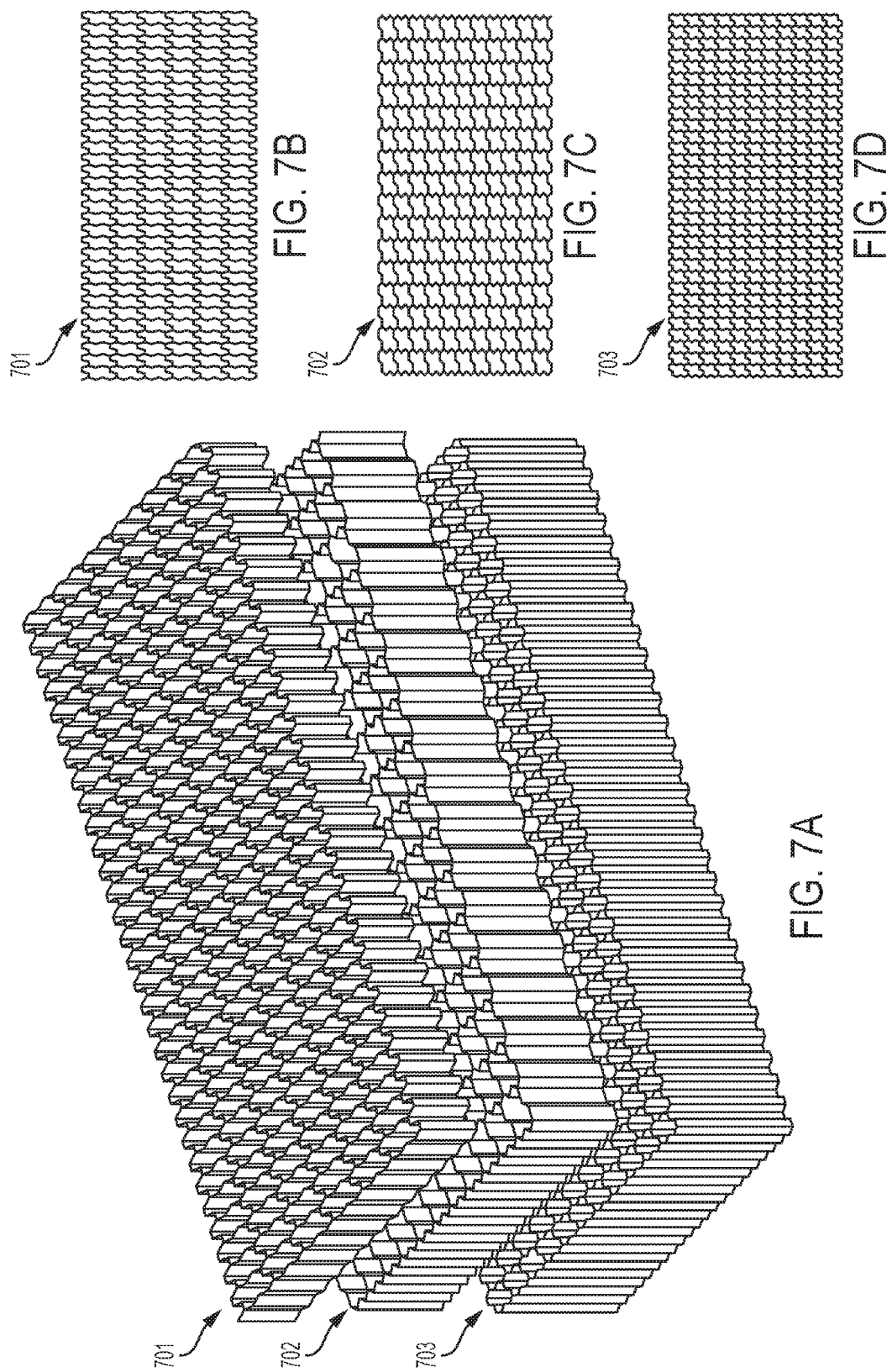

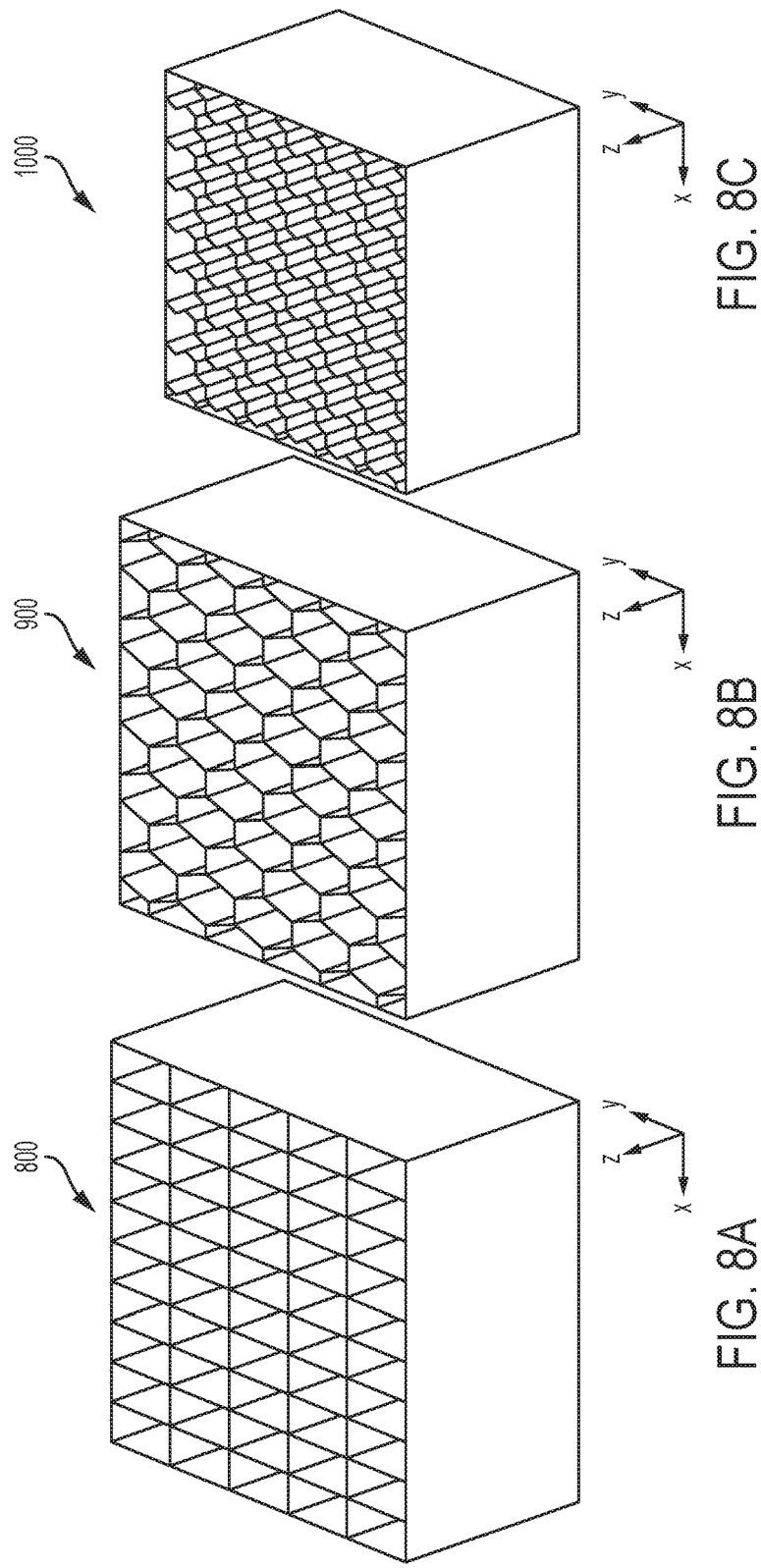

CELLULAR STRUCTURES WITH FOURTEEN-CORNERED CELLS

TECHNICAL FIELD

The present disclosure relates generally to a cellular structure for a structural component. The present disclosure relates more specifically to a cellular structure having a plurality of cells, each cell having a cross section formed by fourteen sides and fourteen corners.

BACKGROUND

It is desirable for a structural component to maximize impact energy absorption and bending resistance while minimizing mass per unit length of the structural component. When a compressive force is exerted on a structural component (e.g., a force from a collision, explosion, projectile, etc.), the structural component can crush and/or bend in a dimensional direction (e.g., longitudinal direction or lateral direction) to absorb the energy of the force. Compressive force energy absorption may be maximized, for example, by assuring that the structural component compacts substantially along a dimensional axis (e.g., longitudinal axis or lateral axis) of the structural component upon experiencing an impact along this axis. Such compaction may be referred to as a stable axial crush of the structural component.

Conventional structural components rely on interior cellular structures with multiple cells that each have a cross section with a basic polygonal shape to improve compressive energy absorption and crush stability. Most often cells having a cross section with a hexagonal shape are used such that the interior cellular structure mimics that of a honeycomb. However, while a cellular structure having such cells with a basic polygonal cross section can provide compressive energy absorption and crush stability for the structural component, such a cellular structure increases the weight of the structural component. It may be desirable to provide a strengthening assembly configured to achieve the same or similar strength increase as provided by the cellular structure made up of cells having a cross section with a basic polygonal shape that facilitates minimizing mass per unit length of the structural component, and maintaining a high manufacturing feasibility.

It may further be desirable to provide a cellular structure and/or a structural component including a cellular structure that can achieve increased energy absorption and a more stable axial collapse when forces such as front and side impact forces are exerted on the structural component, while also conserving mass to minimize the total weight of a structure. Where the structure that the structural component is a part of is a vehicle, such mass conservation can aid in meeting vehicle fuel efficiency and emission requirements. Also, it may be desirable to provide a structural component that can achieve improved energy absorption and bend when a bending force is exerted on the structural component. In addition, it may be desirable, to provide a tunable cross section for cells within the cellular structure that is configured to achieve strength increases (i.e., load carrying and compression energy absorption) over basic polygonal designs, while also allowing flexibility in design to meet a range of applications specific to the structure that the structural component is a part of.

SUMMARY

In accordance with various exemplary embodiments of the present disclosure, a cellular structure is provided. The cellular structure includes a plurality of cells, each cell of the plurality of cells having a fourteen-cornered cross section. The fourteen-cornered cross section includes fourteen sides and fourteen corners.

In accordance with another aspect of the present disclosure, a structural component is provided. The structural component includes at least one wall surrounding a component interior space and a first cellular structure positioned within the interior space. The first cellular structure includes a plurality of cells each having a fourteen-cornered cross section. The fourteen-cornered cross section includes fourteen sides and fourteen corners creating ten internal angles and four external angles.

In accordance with another aspect of the present disclosure, a cellular structure including at least two cells is provided. Each cell includes a plurality of longitudinal walls extending between a top and a bottom of the cell, the longitudinal walls intersecting to create corners of the cell, wherein a transverse cross section of the cell comprises ten internal angles and four external angles.

In accordance with another aspect of the present disclosure, a sandwich structure is provided. The sandwich structure includes first and second substantially planar structures, and a cellular structure positioned between the first and second substantially planar structures. The cellular structure includes at least two cells, each cell comprising a plurality of longitudinal walls extending between a top and a bottom of the cell, the longitudinal walls intersecting to create corners of the cell, wherein a transverse cross section of the cell comprises fourteen corners.

In accordance with another aspect of the present disclosure, an automotive vehicle including an upper body is provided. The upper body includes a rocker and a tire blocker and/or body patch positioned on or adjacent to a front end of the rocker. The tire blocker and/or body patch include a cellular structure comprising a plurality of cells, each cell of the plurality of cells having a fourteen-cornered cross section comprising fourteen sides and fourteen corners.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain principles of the present disclosure.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIG. 5 is a top view of a second exemplary embodiment of a structural component having a cellular structure formed by a plurality of cells, each full cell having the exemplary fourteen-cornered cross section shown in FIGS. 4A-4B;

FIG. 7A is an exploded perspective view of a multilayered structure having three cellular structure layers, each cellular structure layer formed by a plurality of cells, each full cell having an exemplary fourteen-cornered cross section in accordance with the present teachings;

FIG. 7B is a top view of a first cellular structure layer of the multilayered structure shown in FIG. 7A;

FIG. 7C is a top view of a second cellular structure layer of the multilayered structure shown in FIG. 7A;

FIG. 7D is a top view of a third cellular structure layer of the multilayered structure shown in FIG. 7A;

FIG. 8A is a perspective view of a structural component having a cellular structure with a plurality of cells, each full cell having a basic, four-cornered cross section;

FIG. 8B is a detailed perspective view of a structural component having a cellular structure with a plurality of cells, each full cell having a basic, six-cornered cross section;

FIG. 8C is a perspective view of a third exemplary embodiment of a structural component having a cellular structure formed by a plurality of cells, each full cell having an exemplary fourteen-cornered cross section in accordance with the present teachings;

Figure 1A:
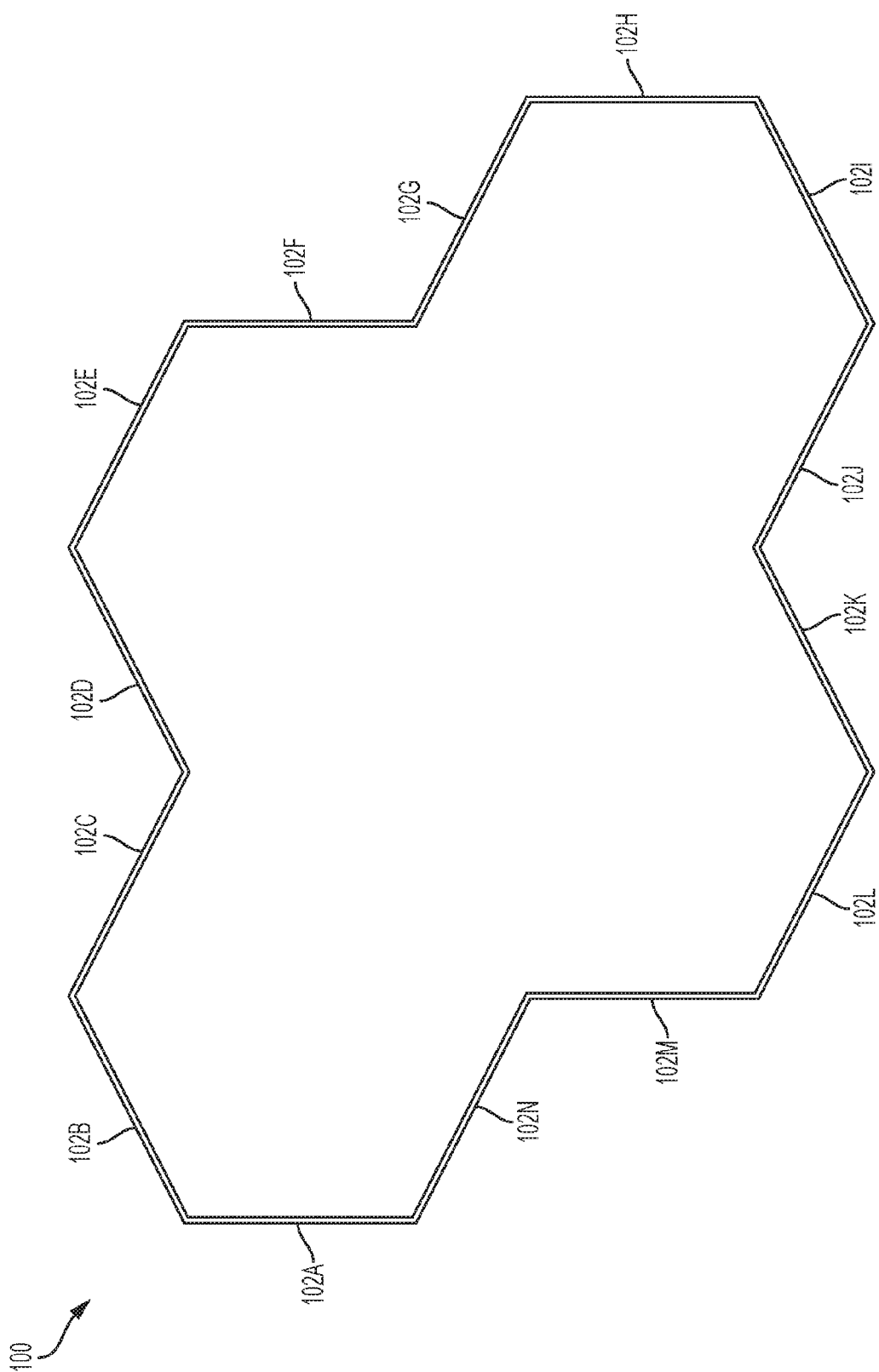
FIG. 1A is a cross-sectional view of an exemplary fourteen-cornered cell of an exemplary cellular structure in accordance with the present disclosure.

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure.

This description's terminology is not intended to limit the disclosed subject matter. For example, spatially relative terms—such as "beneath", "below", "lower", "above", "upper", "proximal", "distal", "front", "rear", "left", "right", "horizontal", "vertical", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features.

The present disclosure contemplates cellular structures which may be used separately or as a part of a structural component. For example, a cellular structure in accordance with the present disclosure may be positioned at least partially within an interior of a structural component. The cellular structures of this disclosure are configured to achieve the same or similar strength increase as provided by a cellular structure made up of cells having a cross section with a basic polygonal shape (e.g., triangular, rectangular, pentagonal, hexagonal, heptagonal, or octagonal), while minimizing mass per unit length of cellular structure and/or the structural component, which contains the cellular structure.

In accordance with one aspect of the present disclosure, a cellular structure includes a plurality of cells, each cell having a cross section formed by fourteen sides and fourteen corners. The cross sectional shapes of the cells of the cellular structures of the present disclosure are designed based in part on, for example, a variety of tunable parameters configured to achieve strength increases (i.e., load carrying and energy absorption) when compared to structural components utilizing conventional cellular structures (e.g., honey comb or square cells), while also allowing design flexibility to meet a range of applications specific to the structure that the structural component is a part of.

In one exemplary embodiment, the fourteen sides and fourteen corners of a cross section of a cell create ten internal angles and four external angles. A cellular structure in accordance with the present teachings may include a plurality of such cells. The plurality of cells may or may not be interconnected. The cellular structure may include a plurality of full cells each having fourteen sides and fourteen corners, as described above. Alternatively, a cellular structure may include a combination of a plurality of full cells and a plurality of partial cells.

In accordance with the present teachings, the shape of the cells of the cellular structures of the structural components disclosed herein provides the cellular structures as well as the overall structural components with stabilized folding, reduced crush distance, and increased energy absorption in response to an applied compression force.

Additionally or alternatively, incorporation of the cellular structures of the present disclosure within a structural component can allow for use of a structural component having an outer periphery formed in a basic polygonal shape, such as a circular, oval, triangle, square, or rectangle, the structural component thus having a cross section of a basic polygonal shape. Thus, rather than relying on a structural component having an outer periphery formed into a complex shape (e.g., a structural component having more than four sides) to provide increased strength and/or minimized mass per unit length of the structural component, a cellular structure according to the present disclosure may be incorporated into an interior of a structural component having a cross section with a basic polygonal shape such that the interior of the structural component is at least partially filled with the cellular structure, which provides increased strength and/or minimized mass per unit length of the structural component. Alternatively, it is also contemplated that a cellular structure according to the present disclosure may be incorporated into an interior of a structural component having an outer periphery in a complex shape, for example a complex polygonal shape.

In some exemplary embodiments, some or all of the cells of an exemplary cellular structure may be partially or wholly filled with various fillers. Further, more than one cellular structure may be provided, and with some or all of one or more of the cellular structures having some or all of the cells of the given structure being partially or wholly filled with one or more types of fillers. For example, where temperature control is desired, some or all of the cells may be partially or wholly filled with thermally insulating filler(s). Exemplary thermally insulating fillers include various foams (e.g., blown fiber glass foam, polyurethane foams), mineral wool, cellulose, polystyrene aerogels, cork, and combinations thereof. Additionally or alternatively, in other various exemplary embodiments, where sound control is required, some or all of the cells of the exemplary cellular structure(s) may be partially or wholly filled with noise insulating filler(s). Exemplary noise insulating fillers include sponge(s) melamine acoustic foams, mineral wool, open-cell rubber foams, and combinations thereof. In further various exemplary embodiments, where further structural reinforcement is desired, the cells may be partially or wholly filled with strengthening filler(s). Exemplary strengthening fillers include structural foam(s), such as thermoplastic structural foams, aluminum foams, glass or carbon fiber-reinforced structural foams, closed-cell polymer foams, and combinations thereof. In some exemplary embodiments, more than one type of filler may be incorporated in the cells. In some other exemplary embodiments, a filler may provide more than one, or even all, of the thermally insulating, noise insulating, and strengthening functions and may partially or wholly fill some or all of the cells of the exemplary cellular structure(s). Alternatively, some or all of the cells may be left unfilled (i.e., hollow or empty).

The cellular structures made up of cells having a fourteen-cornered cross section as disclosed herein, and the structural components that contain one or more such cellular structures, in accordance with the present disclosure, can achieve increased energy absorption and a more stable axial collapse in comparison to cellular structures formed by cells having differing numbers of corners or sides and structural components without cellular structures or containing cellular structure(s) formed by cells having differing numbers of corners or sides, when forces such as front and side compression forces are exerted on the cellular structure and/or structural component. Furthermore, the fourteen-cornered cross section of the cells of the cellular structures and structural components containing cellular structures formed of cells having the fourteen-cornered cross section in accordance with the present disclosure can achieve a similar, if not greater, strength increase than cellular structures formed of cells having a hexagonal cross section (e.g., honeycomb cellular structures) and structural components containing honeycomb cellular structure(s), while minimizing mass per unit length of the cellular structures and structural components, and maintaining a high manufacturing feasibility. In particular, the structural component(s) and/or the cellular structure(s) with fourteen-cornered cells can be formed by stamping, bending, press forming, hydro-forming, molding, casting, extrusion, uniform or non-uniform roll forming, machining, forging, 3D printing, and/or other known manufacturing processes. For example, extrusion and/or molding may be used to form cellular structures with a large number of cells and/or high volume production. Components formed in this manner can be joined via welding (e.g., spot welding, seam welding, laser welding, and friction stir welding), brazing, soldering, adhesive bonding, fastening, press fitting, riveting, screwing, bolting, and/or other known joining technologies.

In another example, cellular structures that are relatively large and include a small number of cells, each cell may be manufactured by other processes separately and then joined together thereafter. Any of the aforementioned manufacturing and joining methods may be used to form such cellular structures which are relatively large and include a small number of cells. Furthermore, any of the aforementioned processes may be used for low volume production, for example, where a specifically tailored cellular structure is required. For example, casting and extrusion may be used to form magnesium and aluminum structural components while molding (injection, blow, and compression molding), extrusion, casting, thermoforming, and foaming may be used to form plastic structural components with cellular structure(s) incorporated therein.

The cellular structure formed by cells having fourteen corners, and structural components containing such cellular structures in accordance with the present teachings can be made, for example, of steel alloys, titanium alloys, aluminum alloys, magnesium alloys, nylons, plastics, polymers, composites, fiber-reinforced composites, silicone, semiconductor, papers, rubber, foams, gels, woods, corks, hybrid materials (i.e., multiple dissimilar materials), shape-memory materials, and/or any other suitable materials. Those of ordinary skill in the art would understand, for example, that the material used for a structural component and cellular structure thereof may be chosen based at least in part on intended application, strength/weight considerations, cost, packaging space, and/or other design factors.

Although discussed herein primarily with respect to automotive applications, the present disclosure contemplates that the various structural components and cellular structures disclosed herein may be suitable for many applications in many fields, including, for example, the fields of aeronautics (e.g., aircraft, spacecraft, etc.), watercrafts (e.g., paneling, body shell structures, interior furniture, etc. of a watercraft), railway vehicles, tram vehicles, high speed rail vehicles, magnetic levitation vehicles, and hyperloop capsules or vehicles, shipping and packaging (e.g., shipping box, pallet, cushioning member, etc.), structural vessel design (e.g., fuselage structures, water vessels, air vessels, locomotives, etc.), deformable barriers (e.g. for vehicle impact testing), turbine design (e.g., rotor blade design of an engine turbine or wind turbine), solar energy (e.g., solar panel design), sporting equipment (e.g., skis, snowboards, surfboards, wakeboards, paddle boards, skateboards, water paddles, ping pong paddles, pickle ball paddles, baseball and softball bases, padding for contact sport pads, helmets, helmet padding, gloves, motor sport body armors, etc.), foot wear (e.g., shoes, athletic shoes, sandals, slippers, socks, etc. and inserts, inner soles, outer soles and upper exteriors thereof), bedding or other furniture cushioning (e.g., mattress layers, mattress pads, pillows, blankets, cushions, etc.), protective cases for mobile devices (e.g. cellular phones, tablets, media players, digital cameras, cameras, etc.), furniture (e.g., tables, stools, and chairs), shelving, storage (e.g. storage bins, tool boxes, travel cases, carrying cases, etc.), insulation (e.g., thermal insulation and sound absorption structures), construction materials (e.g., for wall structures, floor structures, roof structures, ceiling structures of buildings, as well as building surface coverings such as laminates or padding), and other strengthening applications not specifically listed here. This list of potential applications for the structures disclosed herein is intended to be exemplary only, and is not intended to limit or exclude other applications not listed herein.

Figure 1B:
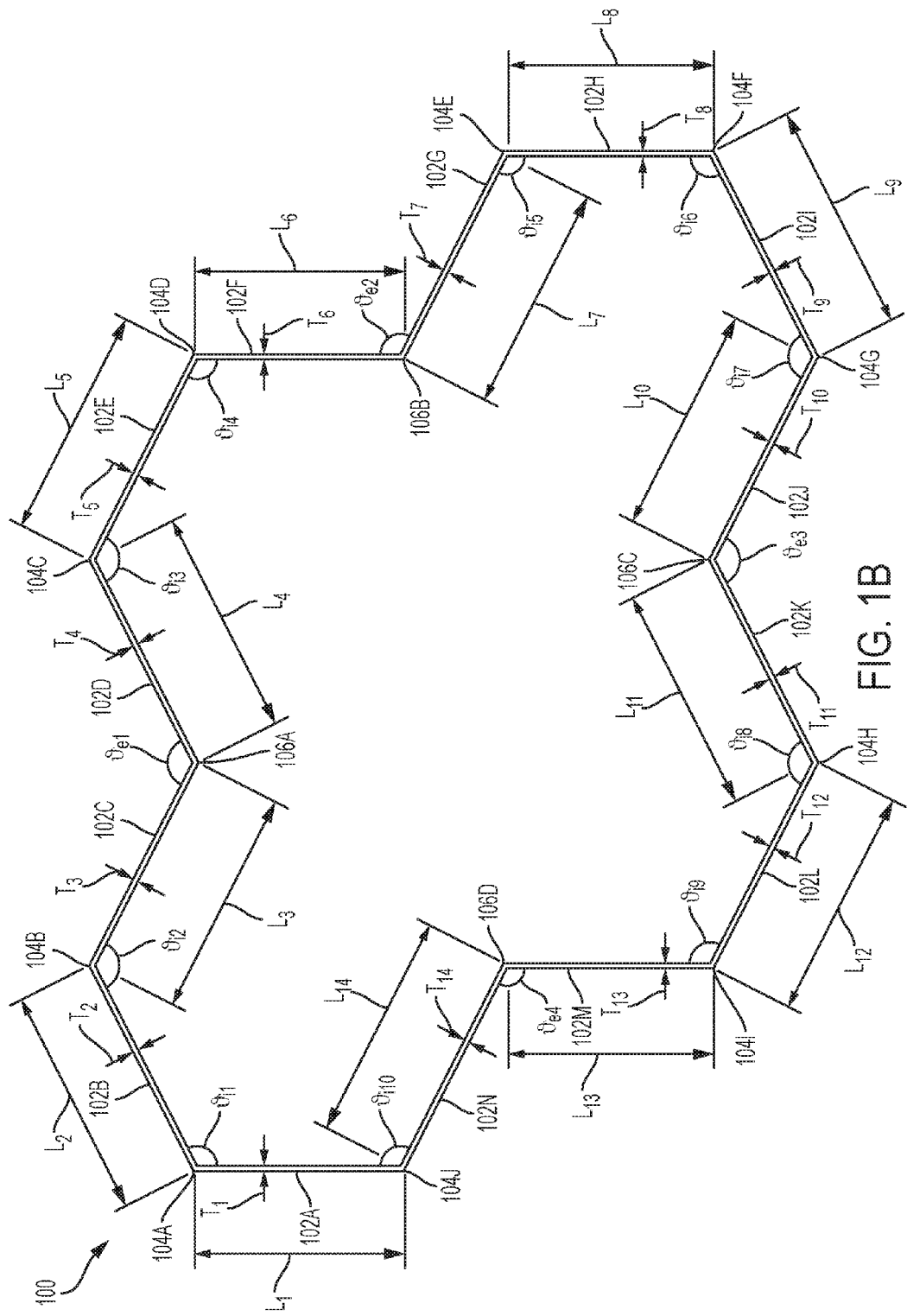
FIG. 1B illustrates an alternative cross-sectional view of the exemplary fourteen-cornered cell of FIG. 1A including additional reference characters.
Figure 1C:
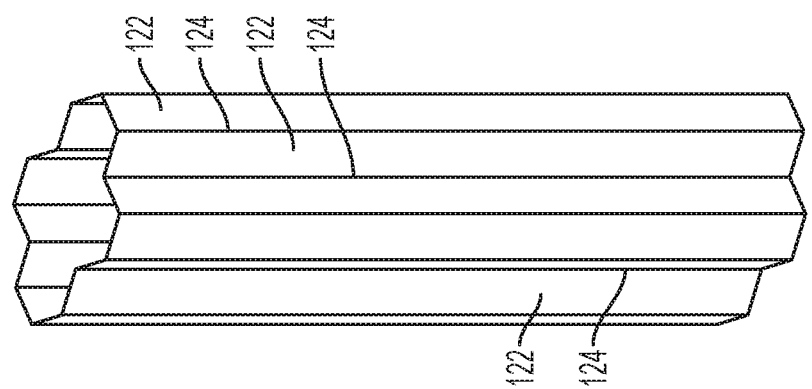
FIG. 1C is a perspective view of the exemplary fourteen-cornered cell of FIG. 1A.

Turning now to the drawings, an exemplary embodiment of a single cell 100 of a cellular structure in accordance with the present disclosure is illustrated in FIGS. 1A-1C. FIG. 1A is a cross-sectional view of single cell 100 of a cellular structure with several reference characters and reference lines being omitted so that the overall cross-sectional shape is clearly shown. FIG. 1B is another cross-sectional view of single cell 100 of a cellular structure including the reference characters omitted from FIG. 1A. FIG. 1C shows a perspective view of the single cell 100 of a cellular structure. Cell 100 has longitudinal walls 122 that meet at longitudinal edges 124, which define fourteen sides 102A-102N and fourteen corners, of which ten are internal corners 104A-104J and four are external corners 106A-106D, of the fourteen-cornered cross section in accordance with the present disclosure. Each side 102A-102N has a cross-sectional length $L_1$-$L_{14}$ and cross-sectional thicknesses $T_1$-$T_{14}$, respectively. Each internal corner 104A-104J has an internal angle $\vartheta_{i1}$-$\vartheta_{i10}$ respectively. Each external corner 106A-106D has an external angle $\vartheta_{e1}$-$\vartheta_{e4}$, respectively. As shown in FIGS. 1A and 1B, each side 102A-102N may be straight and each corner may be defined by straight edges of two adjacent sides. Alternatively, although not shown, sides may be curved at their ends to provide rounded corners. Accordingly, it is contemplated that each corner may be a rounded corner having a bend radius.

Depending upon the particular application and/or the desired features of the structural component and/or the cellular structure thereof, the lengths of the sides and the thicknesses of the sides of the fourteen-sided, fourteen-cornered cross section of the cells of the cellular structure can be varied (i.e., can be tuned) to achieve improved strength and other performance features (e.g., stability of folding pattern) compared to basic polygonal cross sections of cells of a conventional cellular structure. Varying these features of the fourteen-sided, fourteen-cornered strengthening member may obviate the need for increased corner thickness. In accordance with various exemplary embodiments of the present teachings, the cross-sectional lengths $L_1$-$L_{14}$ of sides 102A-102N and the cross-sectional thicknesses $T_1$-$T_{14}$ of the sides 102A-102N can be varied to a certain degree, as would be understood by one skilled in the art, for example in accordance with available space within a structural component.

Cell 100 with the fourteen-cornered cross section shown in FIGS. 1A and 1B has ten internal corners 104A-104J and four external corners 106A-106D. In this exemplary embodiment, each internal angle $\vartheta_{i1}$-$\vartheta_{i10}$ of each internal corner 104A-104J is substantially the same and each external angle $\vartheta_{e1}$-$\vartheta_{e4}$ of each external corner 106A-106D is substantially the same. In this example, the internal angles $\vartheta_{i1}$-$\vartheta_{i10}$ are collectively referred to as internal angle $\vartheta_i$ and the external angles $\vartheta_{e1}$-$\vartheta_{e4}$ may be collectively referred to as external angle $\vartheta_e$. Furthermore, in this exemplary embodiment, each of the internal angles $\vartheta_{i1}$-$\vartheta_{i10}$ of each internal corner 104A-104J and each of the external angles $\vartheta_{e1}$-$\vartheta_{e4}$ of each external corner 106A-106D is substantially the same. In this example, the internal angles $\vartheta_{i1}$-$\vartheta_{i10}$ and the external angles $\vartheta_{e1}$-$\vartheta_{e4}$ may be collectively referred to as corner angle $\vartheta$. FIGS. 1A and 1B illustrate an exemplary embodiment in which the internal angle $\vartheta_i$ is approximately 120 degrees and the external angle $\vartheta_e$ is approximately 120 degrees. Thus, FIGS. 1A and 1B illustrate an exemplary embodiment where each of the ten internal angles $\vartheta_{i1}$-$\vartheta_{i10}$ and each of the four external angles $\vartheta_{e1}$-$\vartheta_{e4}$ are substantially the same corner angle $\vartheta$, and, more particularly, each of the internal angles and external angles are about 120 degrees.

In certain exemplary embodiments of the present disclosure, such as in an automobile, board sport, packaging, furniture, turbine, or solar application, for example, a cross-sectional length $L_1$-$L_{14}$ of each side 102A-102N of the each of the cells 100 can range from about 2 mm to about 100 mm. In other exemplary embodiments, such as in an aircraft, spacecraft, watercraft, wind turbine, or building application, for example, a length of each side $L_1$-$L_{14}$ of the strengthening member may be larger. In yet other exemplary embodiments, such as, for example, some ultra-light spacecraft applications, a length of each side $L_1$-$L_{14}$ of the strengthening member may be smaller, for example, nanoscopic in scale. In some exemplary embodiments the cross-sectional lengths $L_1$-$L_{14}$ of each side (e.g., each side 102A-102N (see FIG. 1B)) is substantially the same. Furthermore, in some other exemplary embodiments the cross-sectional lengths $L_1$-$L_{14}$ of each side can vary with respect to the cross-sectional length of one or more of each other side wall (e.g., cell 400 of FIGS. 4A and 4B). Alternatively or additionally, in some exemplary embodiments, the cross-sectional length of a side can vary along a length of the longitudinal side of the cell (i.e., the longitudinal wall of the cell tapers along its length such that the cross-sectional lengths vary to form the taper).

In certain exemplary embodiments of the present disclosure, such as in a vehicle, board sport, packaging, turbine, or solar application, for example, a cross-sectional thickness $T_1$-$T_{14}$ of each side 102A-102N of the each of the cells 100 can range from about 0.01 mm to about 10 mm. In other exemplary embodiments of the cells of a cellular structure of a structural component, such as in an aircraft, spacecraft, watercraft, wind turbine, or building application, for example, a thickness $T_1$-$T_{14}$ of the sides of the strengthening member may be larger. In yet other exemplary embodiments, such as, for example, ultra-light spacecraft applications, a thickness $T_1$-$T_{14}$ of the sides of the strengthening member may be smaller, for example, nanoscopic in scale. In some exemplary embodiments the cross-sectional thickness $T_1$-$T_{14}$ of each side (e.g., each side 102A-102N (see FIG. 1)) is substantially the same. In some other exemplary embodiments the cross-sectional thickness $T_1$-$T_{14}$ of each side can vary with respect to the cross-sectional thickness of one or more of the other side walls. Alternatively or additionally, the thickness $T_1$-$T_{14}$ can vary within each cross-sectional length of each of side.

The cross-sectional length and thickness of each side of the cells of a cellular structure in accordance with the present disclosure may be sized in relation to one another. For example, a ratio of the cross-sectional thickness of a side to the length of the side may range from about 1:4 to about 1:10,000. In the exemplary embodiment of FIG. 1, where each of the sides 102A-102N has the same cross-sectional length (i.e., $L_1$-$L_{14}$=L) and cross-sectional thickness (i.e., $T_1$-$T_{14}$=T), a ratio of the cross-sectional thickness T of the sides 102A-102P to the cross-sectional length L of the sides 102A-102N (i.e., T:L ratio) may range from about 1:4 to about 1:10,000.

Figure 2:
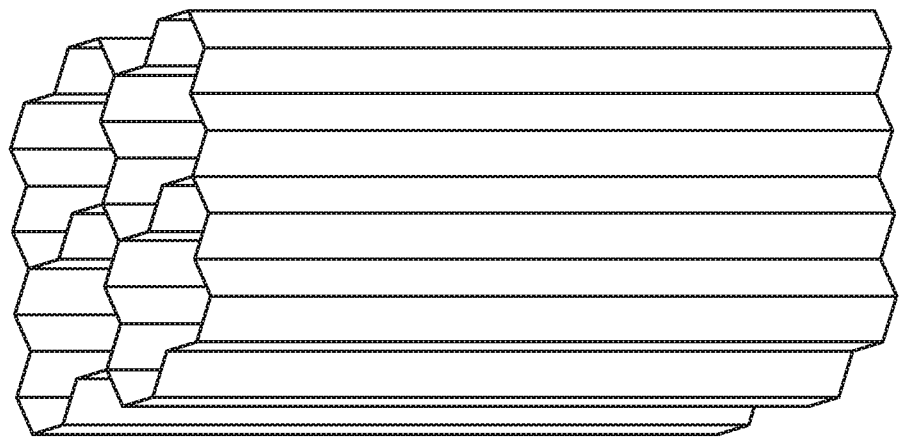
FIG. 2 is a perspective view of a first exemplary embodiment of a cellular structure with a plurality of cells, each full cell having the exemplary fourteen-cornered cross section shown in FIGS. 1A-1B.

Referring now to FIG. 2, a perspective view of an exemplary embodiment of a cellular structure 200 is shown. The cellular structure 200 includes at least two cells 100, each cell 100 having a plurality of longitudinal walls that extend between a top and a bottom of the cell. The longitudinal walls intersect to create corners of each cell 100, and a transverse cross section of each cell 100 includes fourteen corners. The at least two cells 100 may share one or more longitudinal walls. For example, the cells may be interconnected such that each cell shares at least one wall with an adjacent cell or some cells, surrounded by others of the plurality of cells, may share each wall with another adjacent cell. Additionally or alternatively, each cell may be formed completely independently of the other cells in the cellular structure. Furthermore, each cell may have a fourteen-cornered transverse cross section in accordance with, for example, the exemplary embodiments shown in FIGS. 1A-1B and 4A-4B, and/or the descriptions thereof, as set forth herein. Accordingly, the intersections of the longitudinal walls of the cellular structure 200 create ten internal angles and four external angles of each cell 100. Specifically, each cell 100 of the cellular structure 200 includes fourteen longitudinal walls. In various embodiments, such as that shown in FIG. 2, for example, each side and/or surface of a cellular structure is exposed (i.e., free of a panel, wall, or other type of cover structure), such that the cellular structure itself is a stand-alone structural component.

Figure 3A:
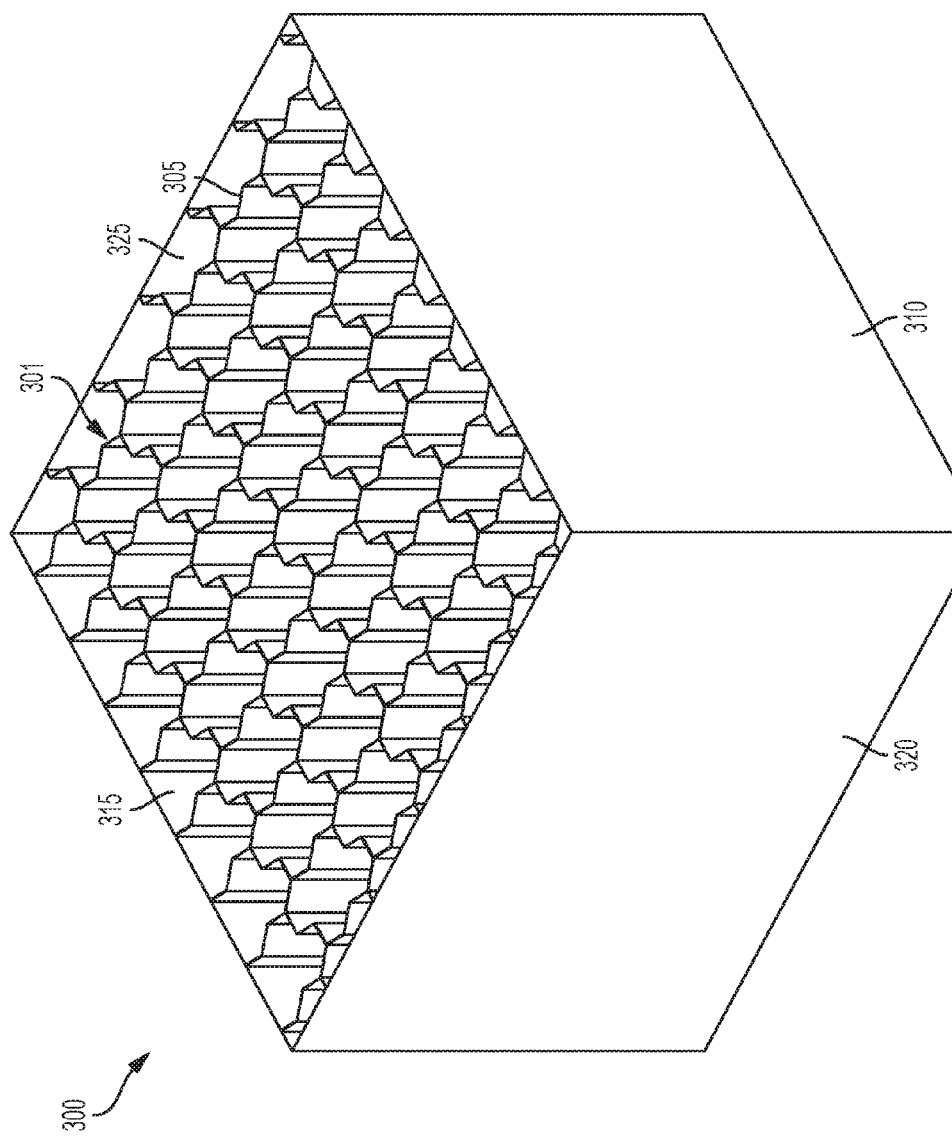
FIGS. 3A-3B are perspective and top views, respectively, of a first exemplary embodiment of a structural component having a cellular structure formed by a plurality of cells, each full cell having the exemplary fourteen-cornered cross section shown in FIGS. 1A-1B.
Figure 3B:
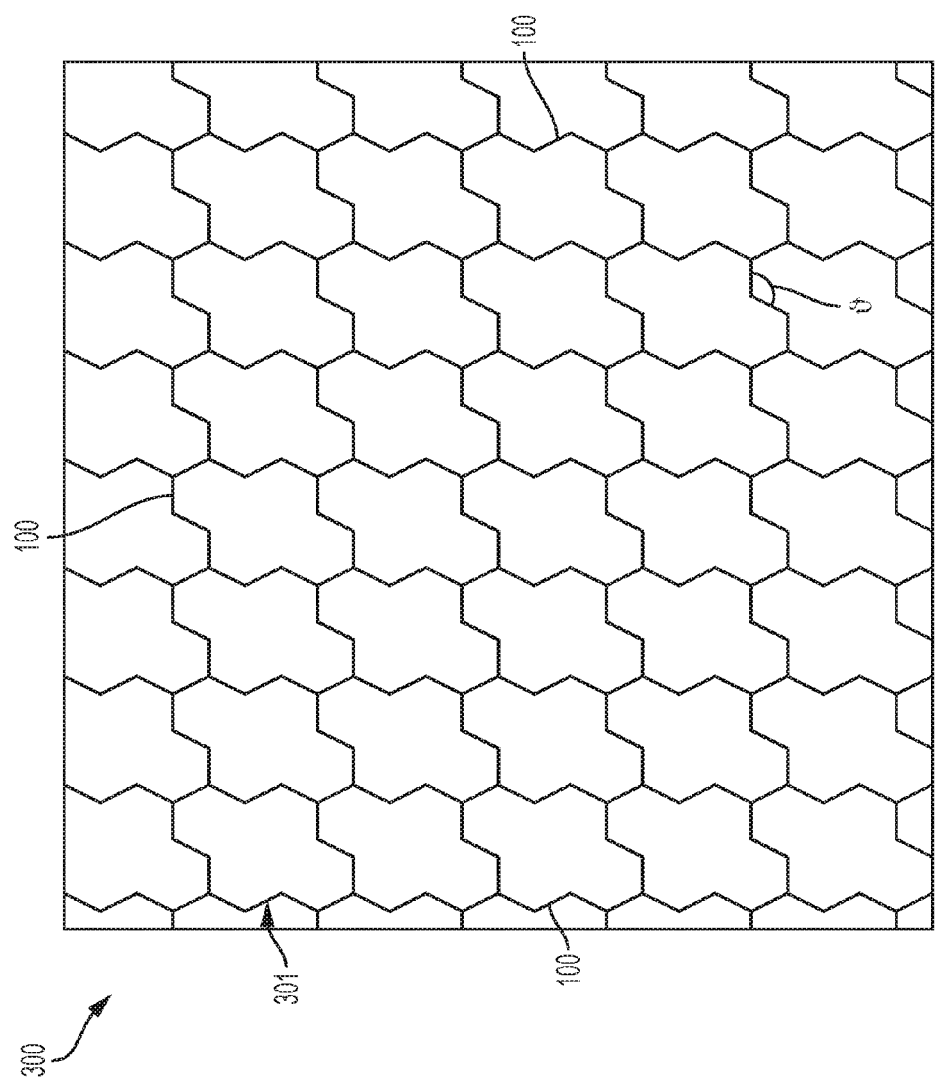

In another exemplary embodiment, illustrated in FIGS. 3A and 3B, a structural component 300 includes cellular structure 301. A cross section of the interior of structural component 300 is entirely filled with a cellular structure 301 made up of a plurality of hollow interconnected cells 100, each with a fourteen-cornered cross section, and fragments (partial cells) thereof. The cellular structure 301 may extend along a full length of the structural component 300 or may extend only along a portion of the length of the structural component. Additionally or alternatively, a plurality of cellular structures 301 may be provided in the structural component 300, for example, stacked one on top of another to fill a length of the structural component 300. Additionally or alternatively, as previously discussed, a portion of one or more of the cellular structures 301 may contain at least some type of filler to provide insulation against sound and/or heat and/or to add additional strength. Further, although not shown, it is contemplated that the interior of a structural component may be only partially filled with a cellular structure made up of interconnected cells 100 with a fourteen-cornered cross section (e.g., at least a portion of one of a width, depth, or height (length) of the structural component may not contact a portion of one or more cellular structures contained within the structural component).

In various exemplary embodiments, the internal cross section of a structural component is defined by at least one side or surface forming the outer periphery of the structural component. For example, the outer periphery of the structural component may include at least one panel, wall, or other type of cover structure. The panel, wall, or other type of cover structure may be opaque or, alternatively, wholly or partially translucent or transparent so as to make the cellular structure optically viewable from the exterior of the structural component. Alternatively, or in addition, to the at least one panel, wall, or other type of cover structure, the structural component may have at least one side or surface that is open (i.e., free of a panel, wall, or other type of cover structure). For example, the structural component 300 of FIG. 3A has six faces, including an upper face that is open and defined by the upper lateral edges 305 of the cells of the cellular structure 301, a lower face (hidden from view in FIG. 3A) that is open and defined by lower lateral edges (hidden from view in FIG. 3A) of the interconnected cells of the cellular structure 301, a front side defined by a front wall 310 (the exterior surface thereof being exposed in FIG. 3A), a rear side defined by a rear wall 315 (a portion of the interior surface thereof being exposed in FIG. 3A), a left side defined by a left wall 320 (the exterior surface thereof being exposed in FIG. 3A), and a right side defined by a right wall 325 (a portion of the interior surface thereof being exposed in FIG. 3A). The open upper face defined by the upper lateral edges 305 of the cells 100 forms a substantially flat top. Similarly, the open lower face defined by lower lateral edges (hidden from view in FIG. 3A) of the interconnected cells 100 forms a substantially flat bottom. The sides or walls (e.g., front wall 310, rear wall 315, left wall 320, and right wall 325) may be unitary with the cellular structure (i.e., formed with the cellular structure) or, alternatively, the cellular structure may be positioned in structural component with sides or walls. Although not shown, angled and/or curved sides and/or faces are also contemplated.

Referring now to FIG. 3B, a top view of the exemplary structural component 300 of FIG. 3A is shown. As described above, and shown in FIG. 3B, each cell 100 of cellular structure 301 of the structural component 300 has a fourteen-cornered cross section with ten internal corners and four external corners. The angle ϑ of each internal corner and external corner is about 120 degrees. Additionally, each side of the cells 100 has the same cross-sectional length and the same cross-sectional thickness. Tuning parameters of the fourteen-cornered cross section of each cell in this manner allows a plurality of the cells to be interconnected such that there is no void between the fourteen-cornered cells. In other words, all of the full-size cells (i.e., cells that are not cut off by a side or surface of the structural component) with a fourteen-cornered cross section are connected together so that there are no gaps or alternatively shaped cells therebetween. In this way, a cellular structure is provided that consists entirely of cells that each have a fourteen-cornered cross section with ten internal corners having an internal angle of about 120 degrees and four external corners having an internal angle of about 120 degrees. Alternatively, in another exemplary embodiment, although not shown, partial cells (i.e., alternatively shaped cells with a cross section having a differing number of total corners or total internal and external corners) that are not cut off by a side or surface of a structural component may be interspersed with, and may be connected to, cells in a cellular structure that includes some cells that have a fourteen-cornered cross section with ten internal corners and four external corners.

As shown in FIG. 3B, the cells may share longitudinal walls. However, alternatively, each cell may have its own longitudinal walls such that two longitudinal walls of adjacent cells form sides that consist of a two wall barrier between each hollow cell cavity (not shown).

Figure 6A:
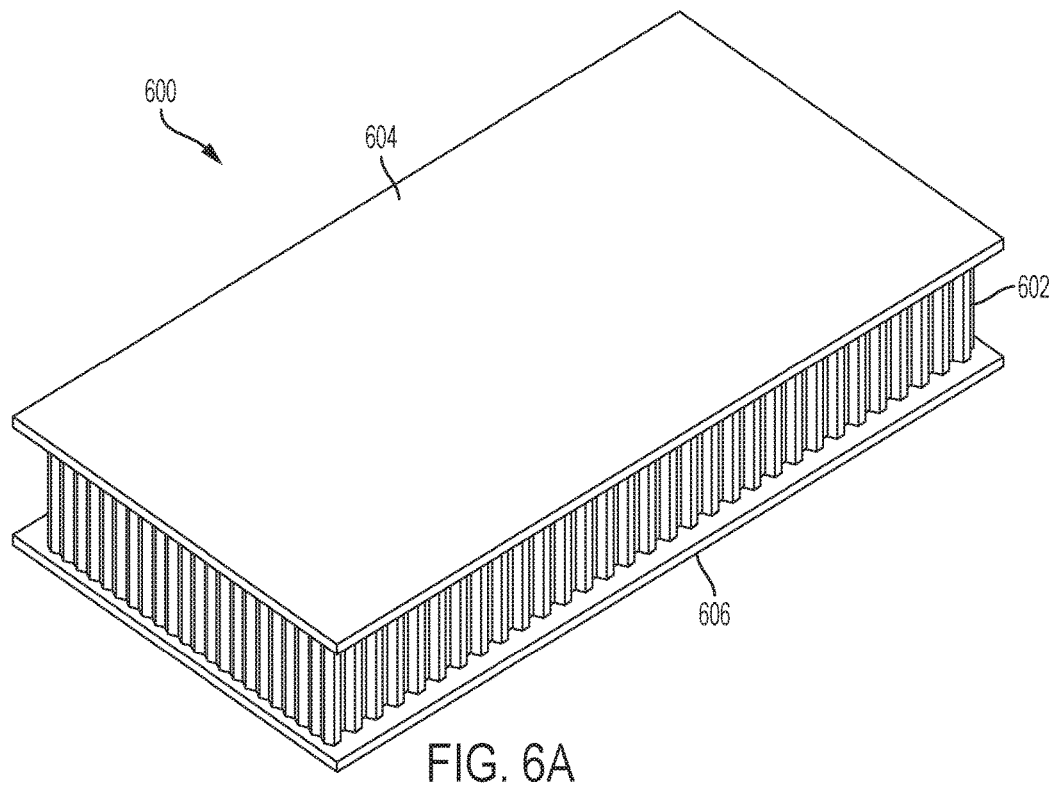
FIG. 6A is a perspective view of an exemplary embodiment of a sandwich structure having a cellular structure formed by a plurality of cells, each full cell having an exemplary fourteen-cornered cross section in accordance with the present teachings.
Figure 6B:
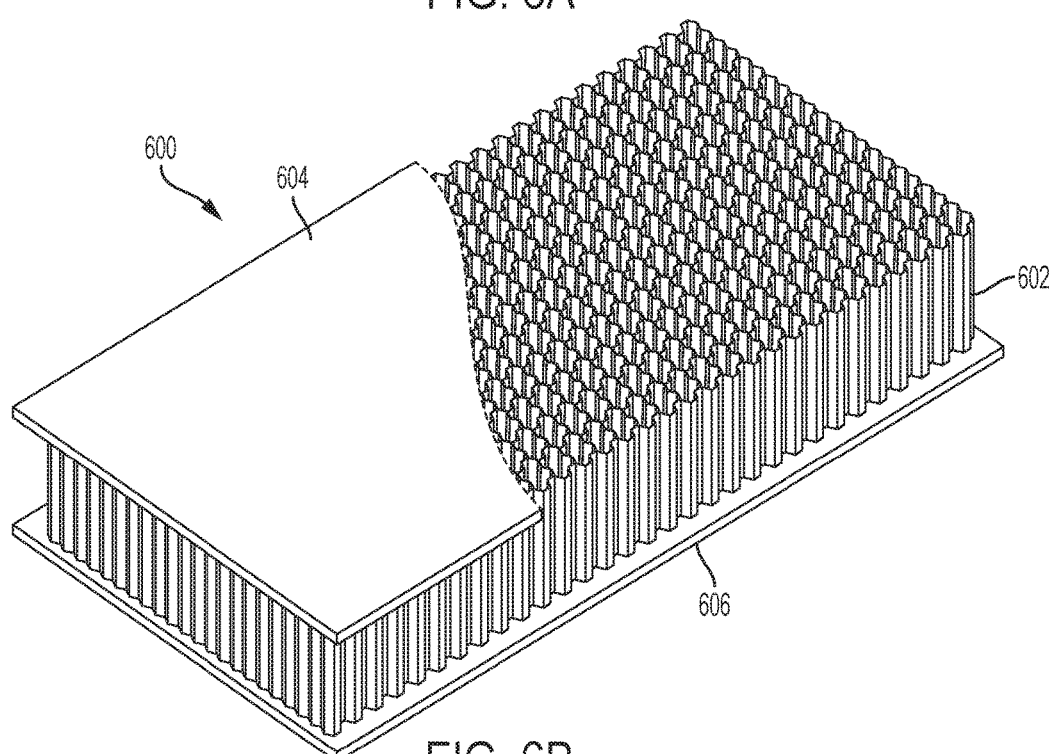
FIG. 6B is a perspective cutaway view of the exemplary embodiment of a sandwich structure shown in FIG. 6A.

In other various alternative embodiments, for example, a structural component may have a cellular structure core with two substantially planar structures on opposing sides of the cellular structure so as to form a sandwich structure. For example, as shown in FIGS. 6A and 6B, a sandwich structure 600 can have a cellular structure 602 between top panel 604 and bottom panel 606. Top and bottom panels 604 and 606 may be in the form of any type of substantially planar structure. The planar structures may be made of, for example, paper, wood, aluminum alloys, polymers, and carbon or glass fiber reinforced composites, and may be opaque, translucent, clear, etc. For example, in some applications in which it a sandwich structure formed from a cellular structure in accordance with the present teachings and at least one substantially planar structure, one of the substantially planar structures may be clear or translucent to allow an observer of the product containing the cellular structure to see a portion of the cellular structure, such that the cellular structure forms a part of the aesthetic design of the product. Such a type of product is shown, for example, in U.S. Patent Application Pub. No. US20080014809, which is incorporated herein by reference. The structure disclosed in US Patent Application Pub. No. US20080014809 is intended to be exemplary only, and many other structures can be used as will be understood by to those of skill in the art.

A cellular structure incorporated into the various sandwich structures contemplated herein includes at least two cells, each cell having a plurality of longitudinal walls that extend between a top and a bottom of the cell. The longitudinal walls intersect to create corners of the cell, and a transverse cross section of the cell may have fourteen corners. Furthermore, each cell may have a fourteen-cornered transverse cross section, for example, in accordance with the exemplary embodiments shown in FIGS. 1A-1B and 4A-4B, and/or the descriptions thereof, as set forth herein.

Cover structures may be formed integrally with a cellular structure via conventional means such as molding and/or casting. Alternatively, cover structures may be bonded, coupled, or otherwise affixed to the cellular structure via any conventional means, such as adhesion, lamination, mechanical fastening and/or welding.

Figure 4A:
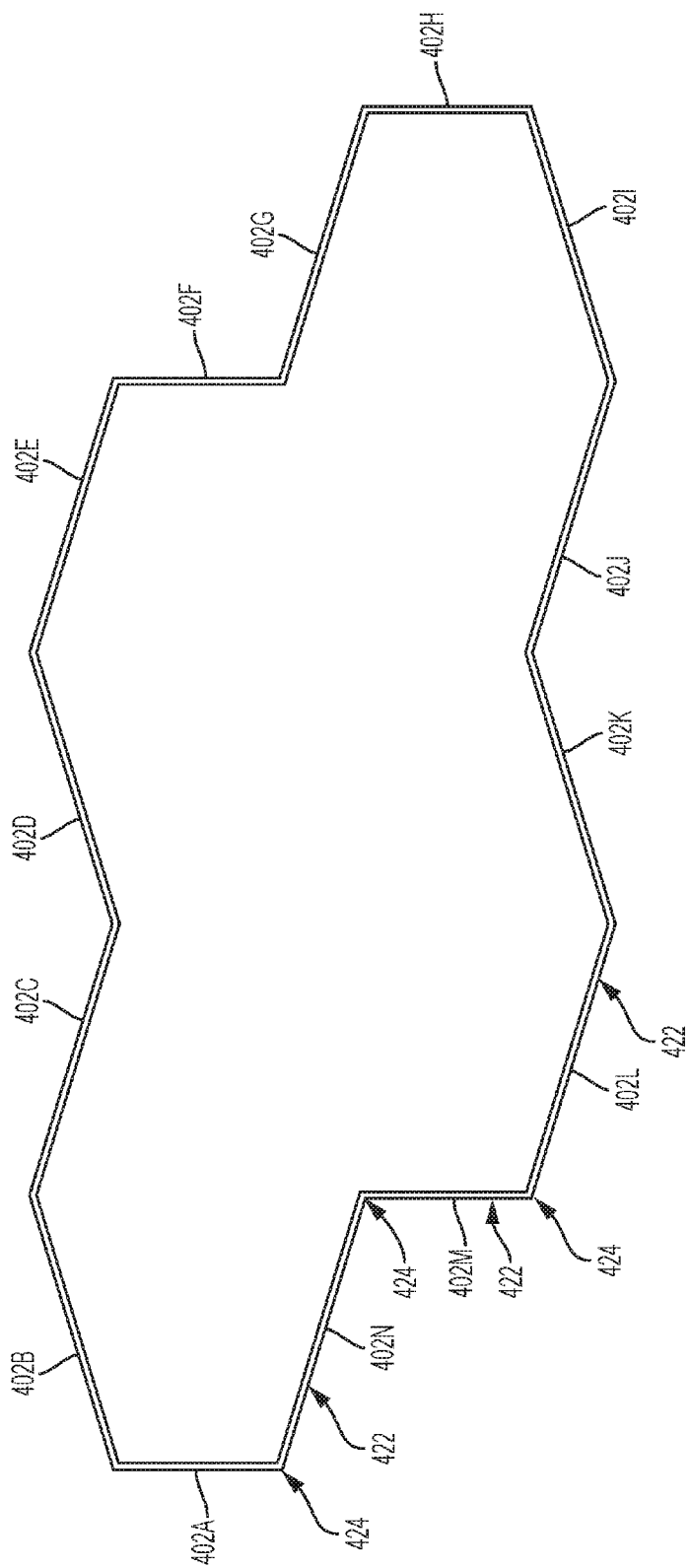
FIG. 4A is a cross-sectional view of an exemplary fourteen-cornered cell of a second exemplary cellular structure in accordance with the present disclosure.
Figure 4B:
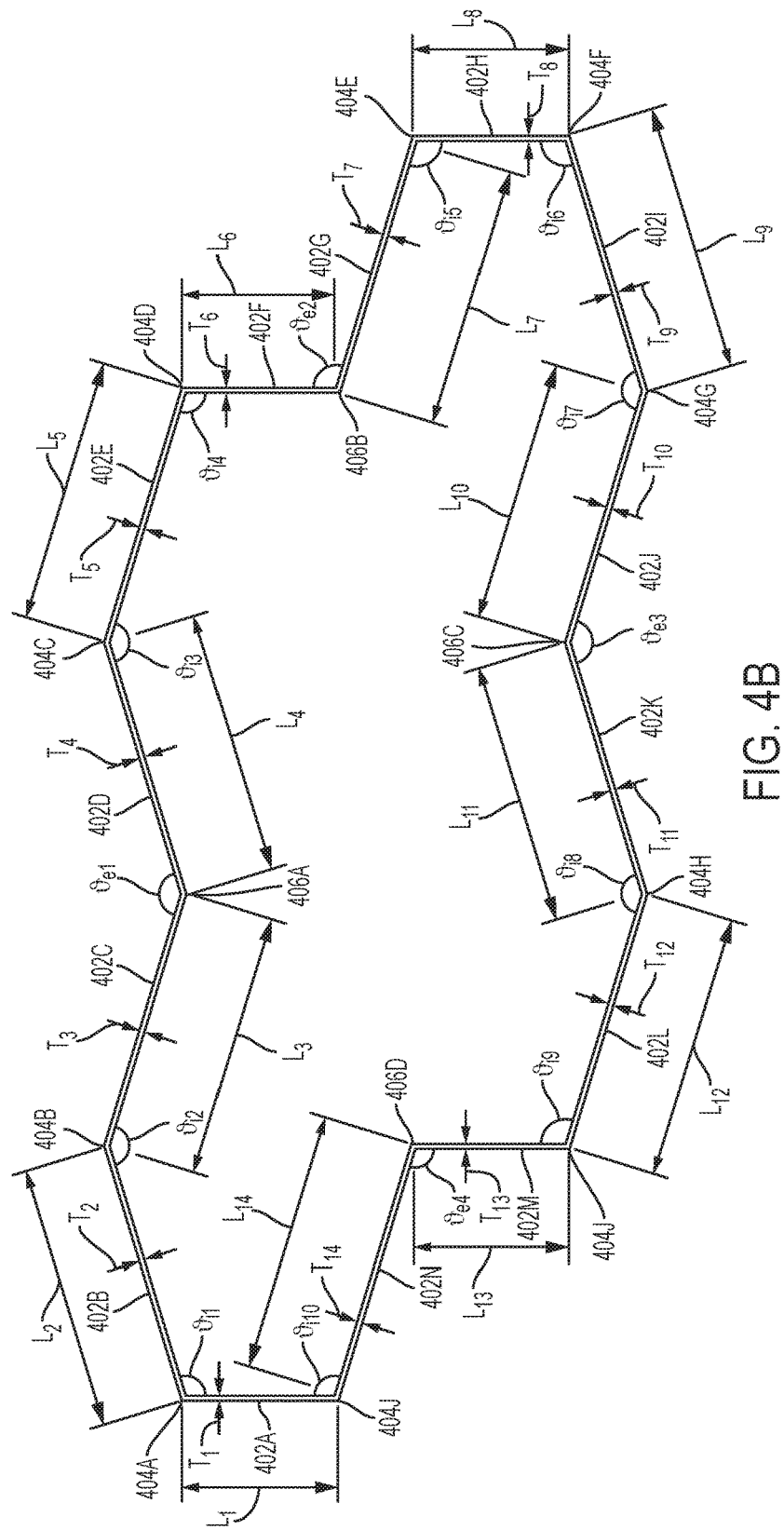
FIG. 4B illustrates an alternative detailed cross-sectional view of the exemplary fourteen-cornered cell of FIG. 4A.

Referring now to FIGS. 4A and 4B another exemplary embodiment of a single cell 400 of a cellular structure in accordance with the present disclosure is illustrated. FIG. 4A is a cross-sectional view of single cell 400 of a cellular structure with several reference characters and reference lines being omitted so that the overall cross-sectional shape is clearly shown. FIG. 4B is another cross-sectional view of single cell 400 of a cellular structure including the reference characters omitted from FIG. 4A. Similar to cell 100, cell 400 has longitudinal walls 422 that meet at longitudinal edges 424, which define fourteen sides 402A-402N and fourteen corners, of which ten are internal corners 404A-404J and four are external corners 406A-406D, of the fourteen-cornered cross section in accordance with the present disclosure. Each side 402A-402N has a cross-sectional length $L_1$-$L_{14}$ and cross-sectional thicknesses $T_1$-$T_{14}$, respectively. Each internal corner 404A-404J has an internal angle $\vartheta_{i1}$-$\vartheta_{i14}$, respectively. Each external corner 406A-406D has an external angle $\vartheta_{e1}$-$\vartheta_{e4}$, respectively. As shown in FIGS. 4A and 4B, each side may be straight and each corner may be defined by straight edges of two adjacent sides. Alternatively, although not shown, it is contemplated that each corner may be a rounded corner having a bend radius and each adjacent straight side may extend from opposing ends of the rounded corner.

Rather than keeping all of the internal angles $\vartheta_{i1}$-$\vartheta_{i10}$ and external angles $\vartheta_{e1}$-$\vartheta_{e4}$ substantially the same, the internal angles $\vartheta_{i1}$-$\vartheta_{i10}$ and external angles $\vartheta_{e1}$-$\vartheta_{e4}$ of each corner of the cells of a cellular structure in accordance with the present disclosure may be sized differently in relation to one another. The internal angles $\vartheta_{i1}$-$\vartheta_{i10}$ and external angles $\vartheta_{e1}$-$\vartheta_{e4}$ of each corner of the cells of a cellular structure may each range from about 60 degrees to about 160 degrees. For example, internal angles $\vartheta_{i2}$, $\vartheta_{i3}$, $\vartheta_{i7}$, and $\vartheta_{i8}$ of internal corners 404B, 404C, 404G, and 404H, respectively, as well as external angles $\vartheta_{e1}$ and $\vartheta_{e3}$, of external corners 406A and 406C, respectively, may each be substantially the same, for example a first angle of about 146 degrees, as shown in FIGS. 4A-4B. Furthermore, internal angles $\vartheta_{i1}$, $\vartheta_{i4}$, $\vartheta_{i5}$, $\vartheta_{i6}$, $\vartheta_{i9}$, and $\vartheta_{i10}$ of internal corners 404A, 404D, 404E, 404F, 404I, and 404J, respectively, as well as external angles $\vartheta_{e2}$ and $\vartheta_{e4}$ of external corners 406B and 406D, respectively, may each substantially the same, for example a second angle of about 106 degrees, as shown in FIGS. 4A-4B. Thus, as demonstrated in FIGS. 4A-4B, four of the internal angles (e.g., $\vartheta_{i2}$, $\vartheta_{i3}$, $\vartheta_{i7}$, and $\vartheta_{i8}$) and two of the external angles (e.g., $\vartheta_{e1}$ and $\vartheta_{e3}$) may be substantially the same (e.g., a first angle measurement of about 146 degrees); and the other six of the internal angles (e.g., $\vartheta_{i1}$, $\vartheta_{i4}$, $\vartheta_{i5}$, $\vartheta_{i6}$, $\vartheta_{i9}$, and $\vartheta_{i10}$) and the other two of the external angles (e.g., $\vartheta_{e2}$ and $\vartheta_{e4}$) may be substantially the same (e.g., a second angle measurement of about 106 degrees).

Rather than keeping all of the cross-sectional lengths $L_1$-$L_{14}$ substantially the same, the cross-sectional lengths $L_1$-$L_{14}$ of each side of the cells of a cellular structure in accordance with the present disclosure may be sized differently in relation to one another. For example, as demonstrated in exemplary embodiment of FIGS. 4A and 4B, each of the sides 402B, 402C, 402D, 402E, 402G, 402I, 402J, 402K, 402L, and 402N has the same cross-sectional length $L_a$ (i.e., $L_2=L_3=L_4=L_5=L_7=L_9=L_{10}=L_{11}=L_{12}=L_{14}=L_a$), and each of the sides 402A, 402F, 402H, and 402M has the same cross-sectional length $L_b$ (i.e., $L_1=L_6=L_8=L_{13}=L_b$), but cross-sectional length $L_a$ and cross-sectional length $L_b$ are different, such that a ratio of the cross-sectional length $L_a$ of sides 402C, 402D, 402E, 402F, 402J, 402K, 402L, 402M, 402N, and 402O to the cross-sectional length $L_b$ of sides 402A, 402B, 402G, 402H, 402I, and 402P (i.e., $L_a:L_b$ ratio) is about 1.83:1. The $L_a:L_b$ ratio of a cross section of a cell of a cellular structure in accordance to the present disclosure may range from about 1:5 to about 5:1.

Turning to FIG. 5, an alternative exemplary embodiment of a structural component 500 is illustrated. FIG. 5 shows a detailed top view of structural component 500. The interior of structural component 500 is entirely filled with a cellular structure 501 made up of interconnected cells 400 with a fourteen-cornered cross section or fragments thereof. Alternatively, although not shown, it is contemplated that the interior of a structural component may be partially filled with a cellular structure made up of interconnected cells 400 with a fourteen-cornered cross section. The cellular structure 501 may extend along a full length of the structural component 500 or may extend only along a portion of the length of the structural component. Additionally or alternatively, a plurality of cellular structures may be provided in the structural component 500, for example, stacked one on top of another to fill a length of the structural component 500. Additionally or alternatively, as previously discussed, a portion of one or more of the cellular structures 501 may contain at least some type of filling to provide insulation against sound and/or heat and/or to add additional strength. Further, although not shown, it is contemplated that the interior of a structural component may be only partially filled with a cellular structure made up of interconnected cells 400 with a fourteen-cornered cross section (e.g., at least a portion of one of a width, depth, or height (length) of the structural component may not contact a portion of one or more cellular structures contained within the structural component).

Each cell 400 of the cellular structure 501 of the structural component 500 has a fourteen-cornered cross section with ten internal corners and four external corners. The various internal angles $\vartheta_{i1}$-$\vartheta_{i10}$ of each internal corner and the various external angles $\vartheta_{e1}$-$\vartheta_{e4}$ of each external corner are sized as set forth in the above description of FIGS. 4A-4B. Additionally, each side wall of the cells 400 has substantially the same cross-sectional thickness and the lengths are tuned with respect to one another as described above. Tuning parameters of the fourteen-cornered cross section of each cell in this manner allows a plurality of the cells to be interconnected such that there is no void between any of the fourteen cornered cells. In other words, all of the full-size cells (i.e., cells that are not cut off by a side or surface of the structural component) with a fourteen-cornered cross section are interconnected together so that there are no gaps or alternative shaped cells therebetween. In this way, a cellular structure is provided that consists entirely of interconnected cells that each have a fourteen-cornered cross section with ten internal corners and four external corners.

As discussed and embodied herein, multiple tunable parameters—including but not limited to the lengths $L_1$-$L_{14}$ and thicknesses $T_1$-$T_{14}$ of the sides of the cells, the internal angles $\vartheta_{i1}$-$\vartheta_{i10}$ and external angles $\vartheta_{e1}$-$\vartheta_{e4}$ of the corners, may all be tuned within the same cellular structure. These parameters all may be tuned within the same cellular structure to provide desired characteristics in the structural component.

In the illustrated embodiments of FIGS. 1A-5, the cellular structure and/or the entire structural component may have a one-piece construction. As stated above, the one-piece constructions shown in FIGS. 1A through 5 are exemplary only and the present teachings contemplate structural component and cellular structures thereof that have other constructions such as two-piece construction or having three or more pieces. For example, the cellular structure may be a separate construction from the one or more panel, wall, or other type of cover structure that defines the one or more one side or surface of a structural component, thereby providing a structural component with an interior cellular structure that is of at least a two-piece construction.

More generally, the various exemplary embodiments of the present teachings contemplate, for example, structural components with interior cellular structure having cells with cross-sectional sides having variable cross-sectional thicknesses, and/or having variable tapered longitudinal walls and edges. Various additional exemplary embodiments contemplate structural components with at least one side or surface that is open or defined by at least one panel, wall, or other type of cover structure, and that the one or more side or surface is bent and/or curved. Moreover, to further adjust a structural component's folding pattern and/or peak load capacity, various additional exemplary embodiments also contemplate structural components and/or the cells of the cellular structure thereof having trigger holes, flanges, and/or convolutions as would be understood by those of ordinary skill in the art.

As mentioned above, an exemplary structural component in accordance with the present disclosure may incorporate multiple cellular structures, with each cellular structure having cells with different parameters and/or different materials in accordance with the present disclosure. Combinations of one or more of the above described variations are also contemplated. For example, as shown in a plurality of cellular structure layers may be placed onto one another other, such that a first cellular structure layer has differently sized cells, longitudinal length, and/or materials than that of a second cellular structure layer. The first and second cellular structure layers may optionally have one or more plate layers disposed between them to facilitate bonding the cellular structure layers together, to control deformation modes and crushing forces of the cellular structure layers, and/or to provide additional strength and stiffness.

Additionally or alternatively, a plurality of cellular structures of the above described varying types may be stacked one on top of another. For example, an exemplary stacked structure may include a first cellular structure layer that consists entirely of connected cells that each have a fourteen-cornered cross section, and a second cellular structure layer that includes some cells that have a fourteen-cornered cross section and some alternatively shaped cells. Another exemplary stacked structure may include a first cellular structure layer that consists entirely of connected cells that each have a fourteen-cornered cross section, and a second cellular structure layer that consists entirely of connected cells that each have a fourteen-cornered cross section with varied dimensions compared to the cells of the first cellular structure layer. Yet another exemplary stacked structure may include a first cellular structure layer includes some cells that have a fourteen-cornered cross section and some alternatively shaped cells, and a second cellular structure layer that includes some cells that have a fourteen-cornered cross section and some alternatively shaped cells with varied dimensions compared to the cells of the first cellular structure layer.

Views of an exemplary structural component with multiple cellular structures are shown in FIGS. 7A-7D. FIG. 7A shows an exploded view of a structural component 700 having three cellular structure layers, each cellular structure layer having a plurality of cells, each full cell having an exemplary fourteen-cornered cross section in accordance with the present teachings. FIGS. 7B, 7C, and 7D, show a top views of the first cellular structure layer 701, the second cellular structure layer 702, and the third cellular structure layer 703, respectively. When compared relative to one another as shown in FIGS. 7A-7D, the size of the cell cross section and a length of the walls (i.e., a longitudinal length of the cells making up the cellular structure layer) may differ from one cellular structure to another. For example, the first cellular structure layer 701 has cells with relatively medium sized cross-sectional dimensions and relatively short longitudinal lengths. The second cellular structure layer 702 has cells with relatively large sized cross-sectional dimensions and relatively medium sized longitudinal lengths. The third cellular structure layer 703 has cells with relatively small sized cross-sectional dimensions and relatively long longitudinal lengths. Optionally, although not shown, structures (e.g., panels) may be disposed between the layers 701, 702, and 703. Additionally, although not shown, structures (e.g., panels similar to top panel 604 and bottom panel 606 of FIGS. 6A-6B) may be disposed to overlie the exposed surfaces of the cellular structures 701, 702, and/or 703.

To demonstrate the improved strength and performance features of a cellular structure consisting of cells having a fourteen-cornered cross section with ten internal angles and four external angles in accordance with the present disclosure, the inventor compared various existing and conventional cellular cross section designs to fourteen-cornered cellular cross sections based on the designs disclosed herein. Exemplary structural components with interior cellular structures were modeled and compression simulation runs were conducted, as shown and described below with reference to FIGS. 8A-17.

Finite element models of structural components with interior cellular structures having interconnected cells with varying shapes (i.e., cross sections) having the same thickness and longitudinal length were developed as illustrated in FIGS. 8A-8C. FIG. 8A shows a perspective view of a structural component 800 with an interior cellular structures having interconnected cells with each full cell having a basic, four-cornered cross section (i.e., rectangle shape). FIG. 8B shows a perspective view of a structural component 900 with an interior cellular structures having interconnected cells with each full cell having a basic, six-cornered cross section (i.e., hexagon shape). FIG. 8C shows a perspective view of a structural component 1000 with an interior cellular structures having interconnected cells with each full cell having a fourteen-cornered cross section, in accordance with the present teachings and similar to that of FIGS. 3A-3B, as described above.

The structural components 800, 900, and 1000 were modeled to have as close to the same total number of cells as possible. The cellular structure of structural component 800 has 50 rectangle cells, the cellular structure of structural component 900 has 50 hexagon cells, and the cellular structure of structural component 1000 has 48 fourteen-cornered cells.

The structural components 800, 900, 1000 have the approximately the same total mass, mass per cell, side thicknesses, and longitudinal length (i.e., length along the z-axis). By virtue of maintaining the total mass, per cell mass, side thicknesses, and total number of cells approximately the same, structural components 800, 900, 1000 each have varied lateral dimensions (i.e., lengths along the x- and y-axes). In particular, structural component 800 was modeled to have lateral dimensions of 185 mm×185 mm; structural component 900 was modeled to have lateral dimensions of 178 mm×178 mm; and structural component 1000 was modeled to have lateral dimensions of 150 mm×150 mm. The longitudinal length of each structural component 800, 900, and 1000 is 100 mm.

To compare the structural components 800, 900, 1000 with interior cellular structures having interconnected cells with varying shapes, exemplary structural components 800, 900, 1000 with interior cellular structure were modeled as structurally described above. In the modeling, the cellular structure of the structural components 800, 900, 1000 were made of aluminum. Multiple finite element experimental test runs were conducted for the aluminum versions of structural components 800, 900, and 1000, as shown and described below with reference to FIGS. 9-11.

The test runs for each structural component simulated an impact with the same boundary condition, rigid mass (e.g. an impactor), impact speed, and initial kinetic energy.

A dynamic crush of aluminum versions of modeled structural components 800, 900, and 1000 was simulated. During each dynamic crush, the impactor is propelled by a gas gun with a designated mass and initial impact velocity which creates a designated initial kinetic energy. The initial kinetic energy crushes the structural component and the initial kinetic energy is transferred into the internal energy of the structural component and cellular structure thereof. Performance of each structural component and cellular structure thereof can be compared by measuring the crush displacement, crush force, and specific energy absorption of each structural component. During the simulated dynamic crush, the structural component 1000 having an aluminum cellular structure with fourteen-cornered cells in accordance with the present disclosure demonstrated shorter crush displacement and smaller folding length (i.e., more concentrated deformation) than the structural components 800 and 900 having an aluminum cellular structure with rectangle and hexagon cells, respectively. Additionally, aluminum versions of structural components 800 and 900 undesirably exhibited more irregular crushing patterns, as evidenced, in particular, by less concentrated and/or more severe and extensive plastic deformation at portions of structural components 800 and 900 in earlier stages of the simulated crush (e.g., 4-8 milliseconds).

Figure 9:
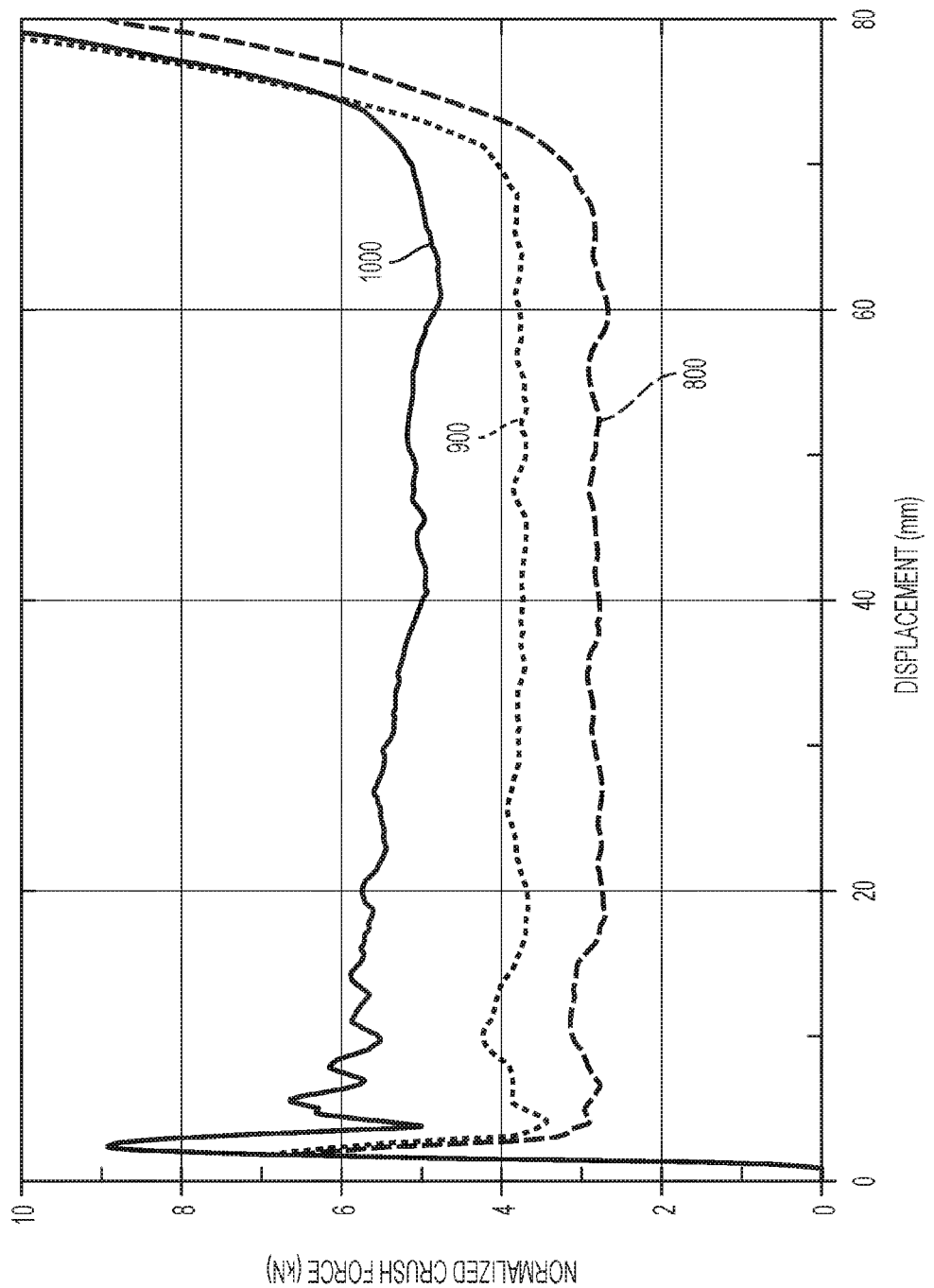
FIG. 9 is a graph of normalized dynamic crush force and associated crush displacement for modeled aluminum versions of the structural components shown in FIGS. 8A-8C.

FIG. 9 graphically portrays the dynamic crush force (in kN) absorbed axially on the modeled aluminum versions of exemplary structural components 800, 900 and 1000, and the associated axial crush displacement (in mm) for the simulated dynamic crush described above. The crush force (in kN) values of the graph have been normalized to account for the slightly different number of cells and mass of each of the structural components 800, 900 and 1000, such that a normalized comparison can be made on a per cell and per unit mass basis. As shown in FIG. 9, the aluminum fourteen-cornered cells of the cellular structure of the structural component 1000 in accordance with the present disclosure could sustain a much higher crushing force for a given resulting crushing distance as compared with the aluminum rectangle and hexagon cells of the cellular structures of the structural components 800 and 900, respectively. Specifically, when averaged over the range of 0 to 60 mm of displacement, the aluminum fourteen-cornered cells of the cellular structure of the structural component 1000 accordance with the present disclosure achieved about a 42.1% increase in normalized average crush force as compared with the aluminum hexagon cells of the cellular structure of the structural component 900. The aluminum fourteen-cornered cells of the cellular structure of the structural component 1000 also achieved about a 86.7% increase in normalized average crush force (over the range of 0 to 60 mm displacement) as compared with the aluminum rectangle cells of the cellular structure of the structural component 800.

Figure 10:
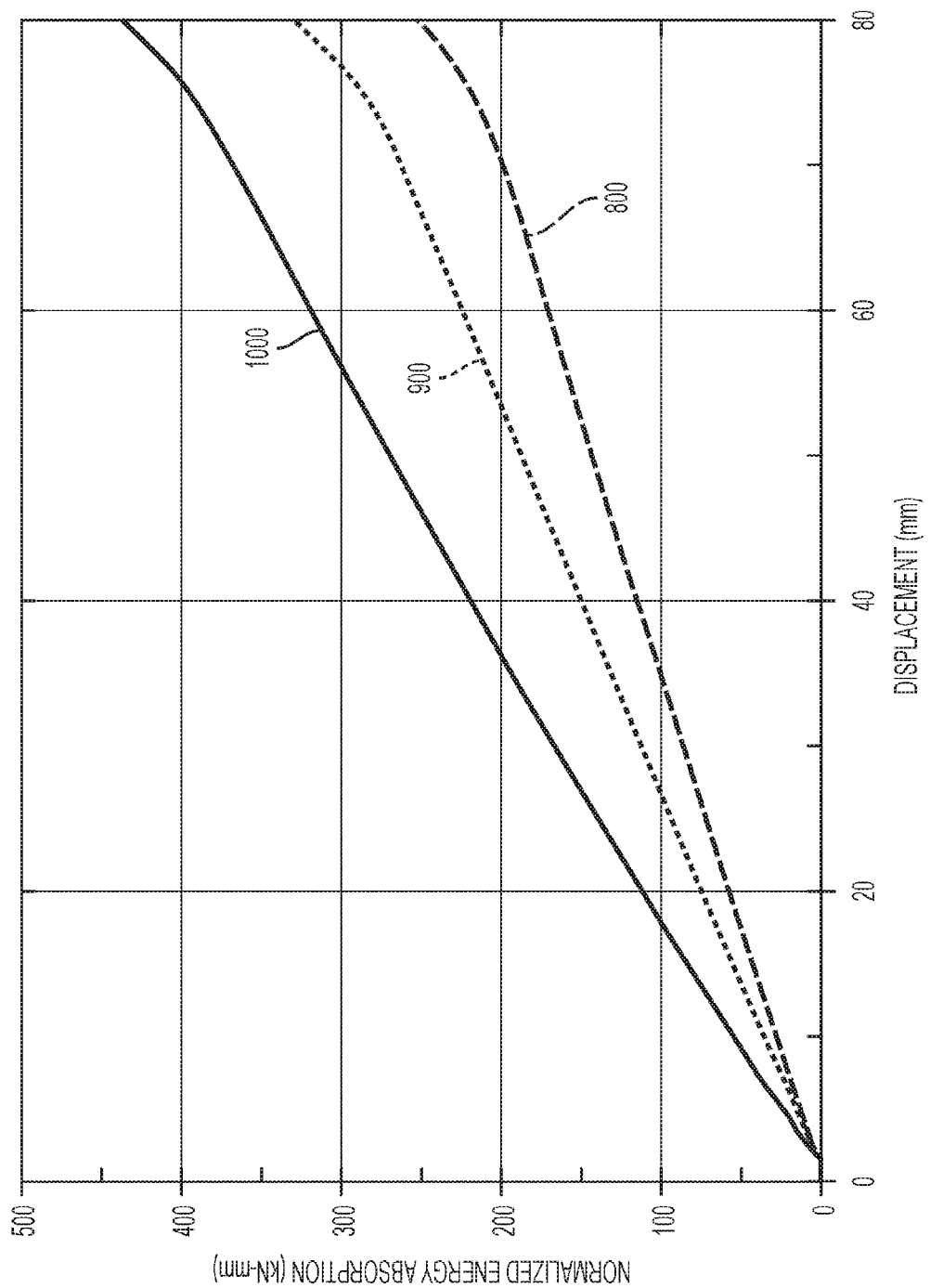
FIG. 10 is a graph of normalized dynamic axial crush energy absorbed and associated axial crush displacement for modeled aluminum versions of the structural components shown in FIGS. 8A-8C.

FIG. 10 graphically portrays the dynamic axial crush energy (in kN-mm) absorbed axially by the modeled aluminum version of exemplary structural components 800, 900 and 1000, and the associated axial crush displacement (in mm) for the simulated dynamic crush described above. The crush energy (in kN-mm) values of the graph have been normalized to account for the slightly different number of cells and mass of each structural component 800, 900 and 1000, such that a comparison can be made on a per cell and per unit mass basis. As shown in FIG. 10 the aluminum fourteen-cornered cells of the cellular structure of the structural component 1000 in accordance with the present disclosure could absorb the same total kinetic energy of the impact over a much shorter distance as compared the aluminum rectangle and hexagon cells of the cellular structures of the structural components 800 and 900, respectively. Specifically, for example, at 60 mm displacement the aluminum fourteen-cornered cells of the cellular structure of the structural component 200 accordance with the present disclosure had absorbed about 42.1% more energy as compared to the amount of energy absorbed by the aluminum hexagon cells of the cellular structure of the structural component 900 at a displacement of 60 mm. The aluminum fourteen-cornered cells of the cellular structure of the structural component 1000 accordance with the present disclosure also had absorbed about 86.7% more energy at 60 mm displacement as compared to the amount of energy absorbed by the aluminum rectangle cells of the cellular structure of the structural component 800 at a displacement of 60 mm.

A quasi-static crush of aluminum versions of modeled structural components 800, 900, and 1000, respectively, was also simulated. The results of the simulated quasi-static crush for each aluminum model are graphically portrayed in FIG. 11. During each quasi-static crush the impact speed is slow (e.g., 1 in/min). An impactor compresses the structural components with a controlled displacement. Therefore, all structural components reach the same crush distance with the same crush time. Thus, subjecting structural components with various cellular structures to a quasi-static crush provides a comparison of the resistance to deformation (including the deformation severity in elastic range and plastic range) and the peak force of the structural components. As used herein, the term "peak force" is defined as the maximum load of compressive force that a structure can withstand before exhibiting plastic deformation (as opposed to elastic deformation). A person of ordinary skill in the art will understand that plastic deformation is permanent, non-reversible deformation that will remain after removal of the compression load, and that elastic deformation is temporary, reversible deformation that will diminish upon removal of the compression load. The quasi-static loading condition informs how a structure will respond in situations such as, for example, loading of cargo and/or passengers.

In the simulated quasi-static crush of the aluminum versions of modeled structural components 800, 900, and 1000, the aluminum structural component 1000 was observed to exhibit less deformation at each level of controlled displacement, including in both the elastic and plastic deformation ranges, as compared with the aluminum structural components 800 and 900, respectively. Additionally, the observed deformation spread to the lower portions of the cellular walls faster in structural components 800 and 900 than in structural component 1000. Accordingly, the plastic deformation that occurred in the structural component 1000 was more localized, in that it was concentrated in regions close to the impactor, while the plastic deformation of the structural components 800 and 900 was more extensive, in that it spread to the entire structure. The results indicate that the structural component 1000 has higher resistance to elastic and plastic deformation compared to the structural components 800 and 900. If plastic deformation does occur under a very severe loading condition, a structural component 1000 will exhibit less severe and more locally concentrated plastic deformation, and is therefore expected to be easier and less costly to repair.

Figure 11:
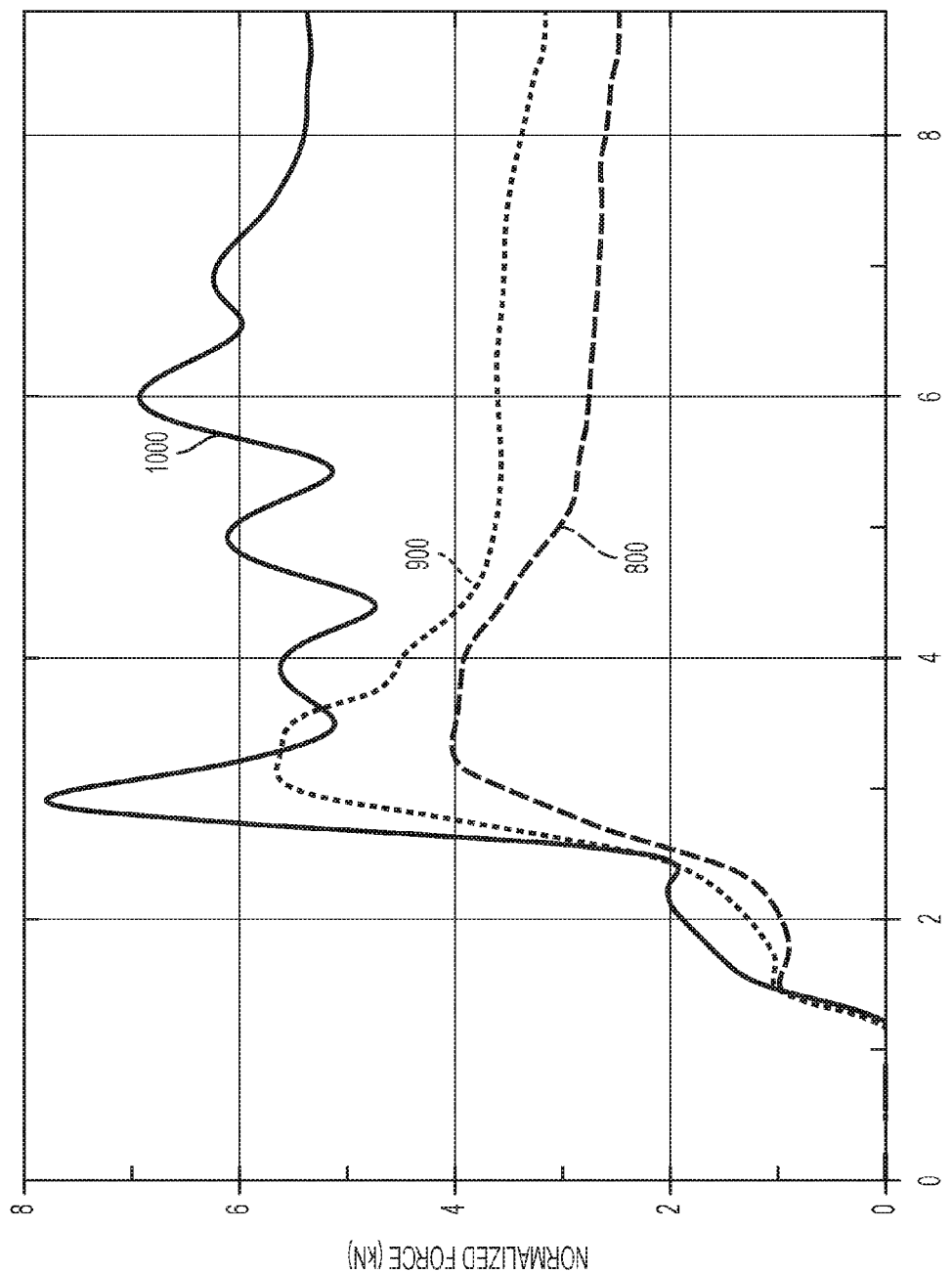
FIG. 11 is a graph of normalized quasi-static crush force and associated crush displacement for modeled aluminum versions of the structural components shown in FIGS. 8A-8C.

FIG. 11 graphically portrays the normalized crush force (in kN) absorbed axially on the modeled aluminum version of exemplary structural components 800, 900 and 1000, and the associated axial crush displacement (in mm) for the simulated quasi-static crush described above. The crush force (in kN) values of the graph have been normalized to account for the slightly different number of cells and mass of each structural components 800, 900 and 1000, such that a comparison can be made on a per cell and per unit mass basis. As shown in FIG. 11, aluminum fourteen-cornered cells of the cellular structure of the structural component 1000 accordance with the present disclosure demonstrated the higher normalized peak force as compared with the aluminum rectangle and hexagon cells of the cellular structures of the structural components 800 and 900, respectively. Specifically, the aluminum fourteen-cornered cells of the cellular structure of the structural component 1000 accordance with the present disclosure achieved a normalized peak force of about 7.79 kN, the aluminum hexagon cells of the cellular structure of the structural component 900 had a normalized peak force of about 5.64 kN, and the aluminum rectangle cells of the cellular structure of the structural component 800 had a normalized peak force of about 4.04 kN. Thus, the aluminum fourteen-cornered cells of the cellular structure of the structural component 1000 accordance with the present disclosure achieved about a 38.1% increase in normalized peak force as compared with the aluminum hexagon cells of the cellular structure of the structural component 900 and about a 92.8% increase in normalized peak force as compared with the aluminum rectangle cells of the cellular structure of the structural component 800. The above results confirm that the structural component 1000 can sustain much higher load before exhibiting plastic deformation than the structural components 800 and 900.

Figure 12:
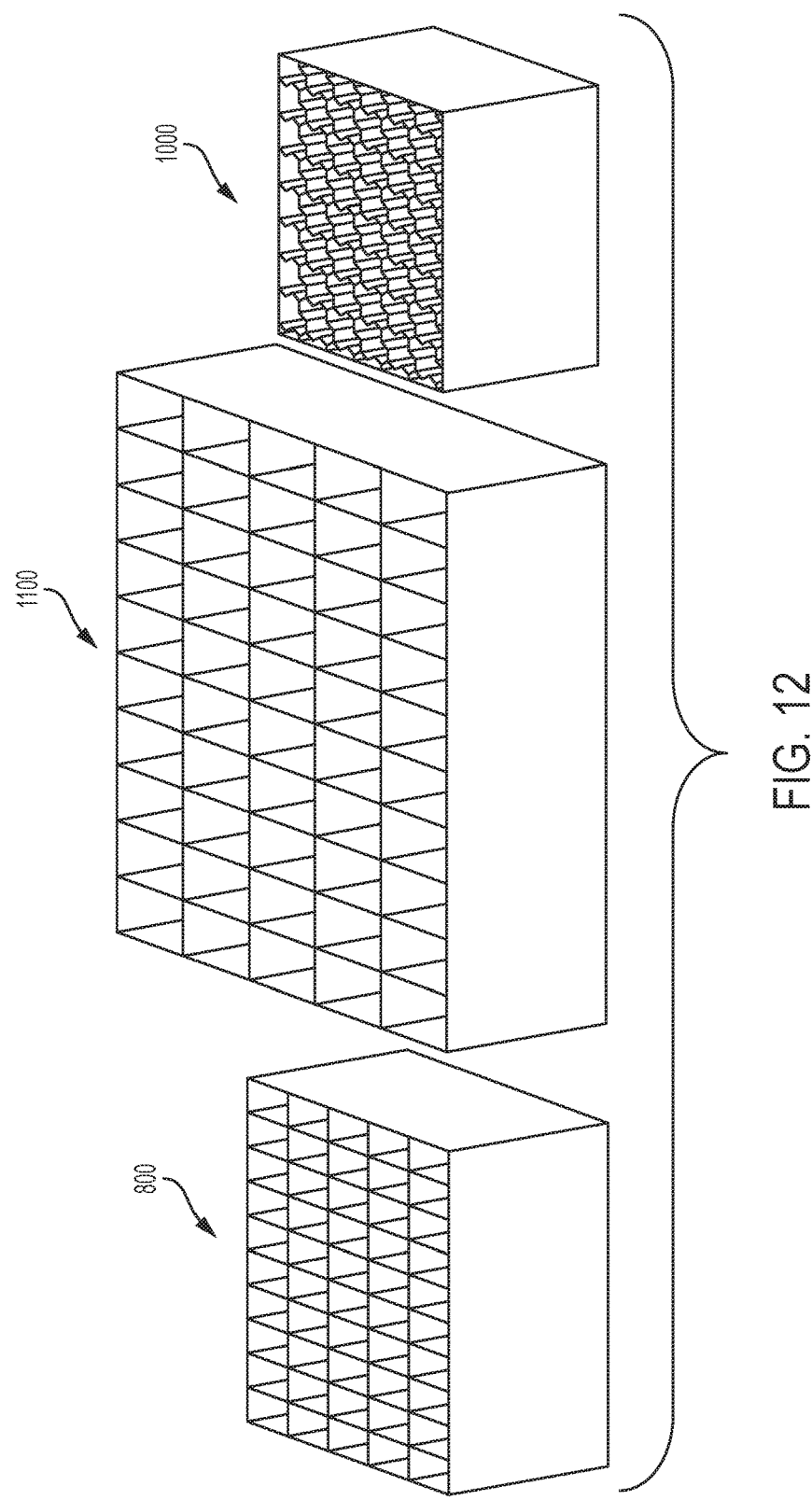
FIG. 12 illustrates various structural components, each component having either a square-celled cellular structure or a fourteen-corner-celled cellular structure.

For further comparison, finite element models of structural components with interior cellular structures having interconnected cells with varying shapes (i.e., cross sections) having the same thickness were developed as illustrated in FIG. 12. FIG. 12 shows perspective views of a structural component 800 with an interior cellular structures having interconnected cells with each full cell having a basic, four-cornered cross section (i.e., rectangle shape) (like that of FIG. 8A as described above), another structural component 1100 with an interior cellular structures having interconnected cells with each full cell having a basic, four-cornered cross section (i.e., rectangle shape), and a structural component 1000 with an interior cellular structures having interconnected cells with each full cell having a fourteen-cornered cross section (like that of FIG. 8C, as described above).

The cellular structure of structural component 800 has 50 rectangle cells, the cellular structure of structural component 1100 has 50 rectangle cells, and the cellular structure of structural component 1000 has 48 fourteen-cornered cells.

The structural components 800 and 1000 have the approximately the same total mass, mass per cell, side thicknesses, and longitudinal length (i.e., length along the z-axis). By virtue of maintaining the total mass, per cell mass, side thicknesses, and total number of cells approximately the same, structural components 800 and 1000 each have varied lateral dimensions (i.e., lengths along the x- and y-axes). In particular, structural component 800 was modeled to have lateral dimensions of 185 mm×185 mm; and structural component 1000 was modeled to have lateral dimensions of 150 mm×150 mm. To provide further comparison, structural component 1100 was modeled to have approximately the same side thickness and longitudinal length, but an increased total mass, and mass per cell. Accordingly, structural component 1100 has varied lateral dimensions. In particular, structural component 1100 as modeled to have lateral dimensions of 301 mm×301 mm. The longitudinal length of each structural component 800, 1000, and 1100 is 100 mm.

To compare the structural components 800, 1000, 1100 with interior cellular structures having interconnected cells with varying shapes, exemplary structural components 800, 1000, 1100 with interior cellular structure were modeled as structurally described above. In the modeling, the cellular structure of the structural components 800, 1000, 1100 were made of aluminum. Multiple finite element experimental test runs were conducted for the aluminum versions of structural components 800, 1000, and 1100, as shown and described below with reference to FIGS. 13-14. Notably, the aluminum version of cellular structure 1100 shown in FIG. 12 was modeled to have about 63% more mass than the aluminum versions of cellular structures 800 and 1000.

The test runs for each structural component simulated an impact with the same boundary condition, rigid mass (e.g. an impactor), impact speed, and initial kinetic energy.

A dynamic crush of aluminum versions of modeled structural components 800, 1000, and 1100 was simulated. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. Throughout the simulated dynamic crush, the structural component 1000 having an aluminum cellular structure with fourteen-cornered cells in accordance with the present disclosure demonstrated shorter crush displacement than the structural components 800 and 1100 having an aluminum cellular structure with rectangle cells. Also, the fourteen-cornered cells in the structural component 1000 exhibited smaller folding lengths than the rectangular cells in the structural components 800 and 1100, respectively. Additionally, aluminum versions of structural components 800 and 1100 undesirably exhibited more irregular crushing patterns, as evidenced, in particular, by the less concentrated and/or more severe and extensive plastic deformation in lower portions of structural components 800 and 1100.

Figure 13:
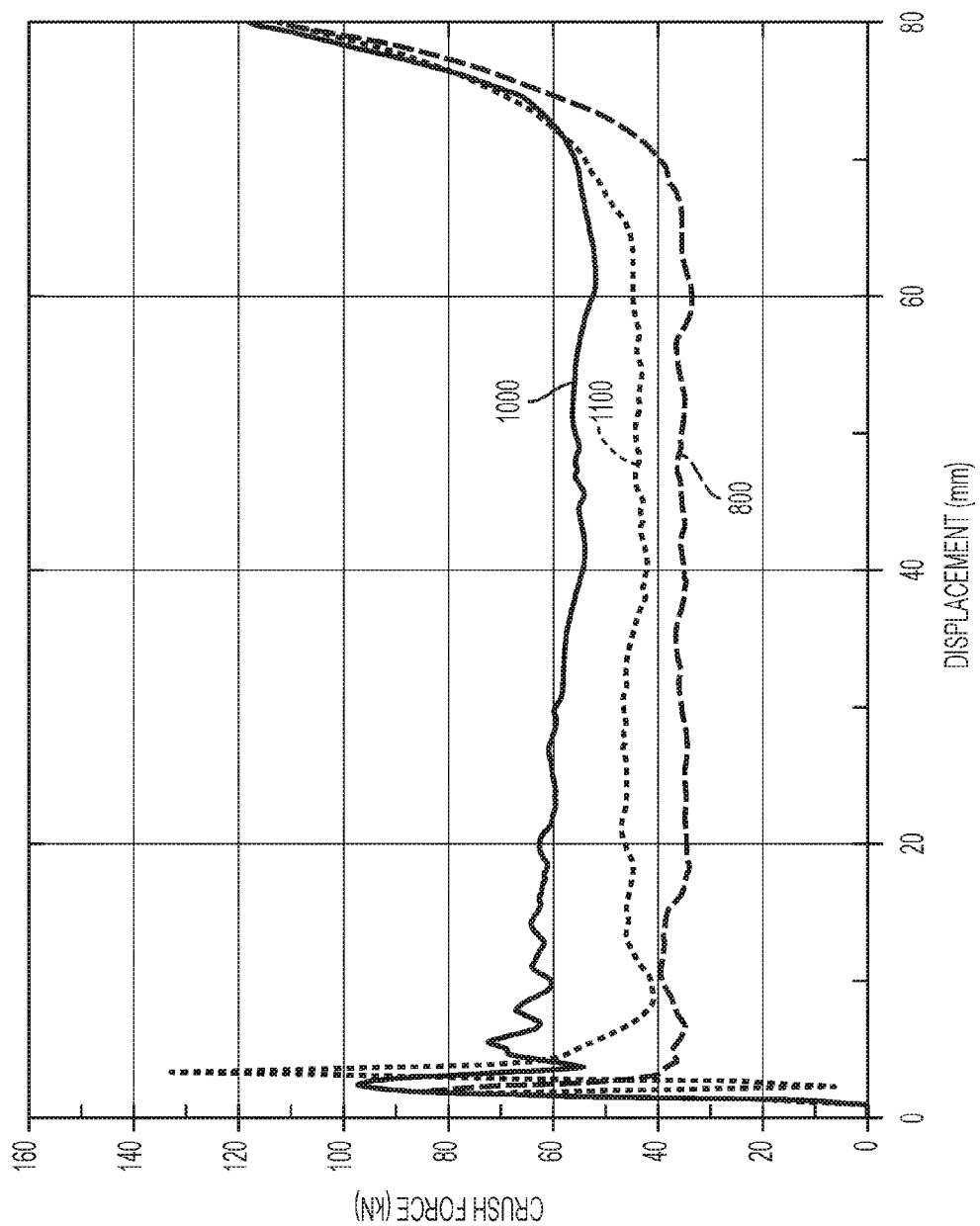
FIG. 13 is a graph of dynamic crush force and associated crush displacement for modeled aluminum versions of the structural components shown in FIG. 12.

FIG. 13 graphically portrays the dynamic crush force (in kN) absorbed axially on the modeled aluminum version of exemplary structural components 800, 1000 and 1100, and the associated axial crush displacement (in mm) for the simulated dynamic crush described above. As shown in FIG. 13, the aluminum fourteen-cornered cells of the cellular structure of the structural component 1000 in accordance with the present disclosure sustained a higher crushing force for a given resulting crushing distance as compared with the aluminum four-cornered cells of the cellular structures of the structural components 800 and 1000. Specifically, when averaged over the range of 0 to 60 mm of displacement, the fourteen-corner-celled aluminum cellular structure of the structural component 1000 accordance with the present disclosure achieved about a 61.4% increase in average crush force as compared with the rectangle-celled aluminum cellular structure of the structural component 800. The fourteen-corner-celled aluminum cellular structure of the structural component 1000 also achieved about a 29.6% increase in average crush force (over the range of 0 to 60 mm displacement) as compared with the rectangle-celled aluminum cellular structure of the structural component 1100 despite the fact that structural component 1100 has a much larger total mass as well as larger lateral dimensions than structural component 1000.

Figure 14:
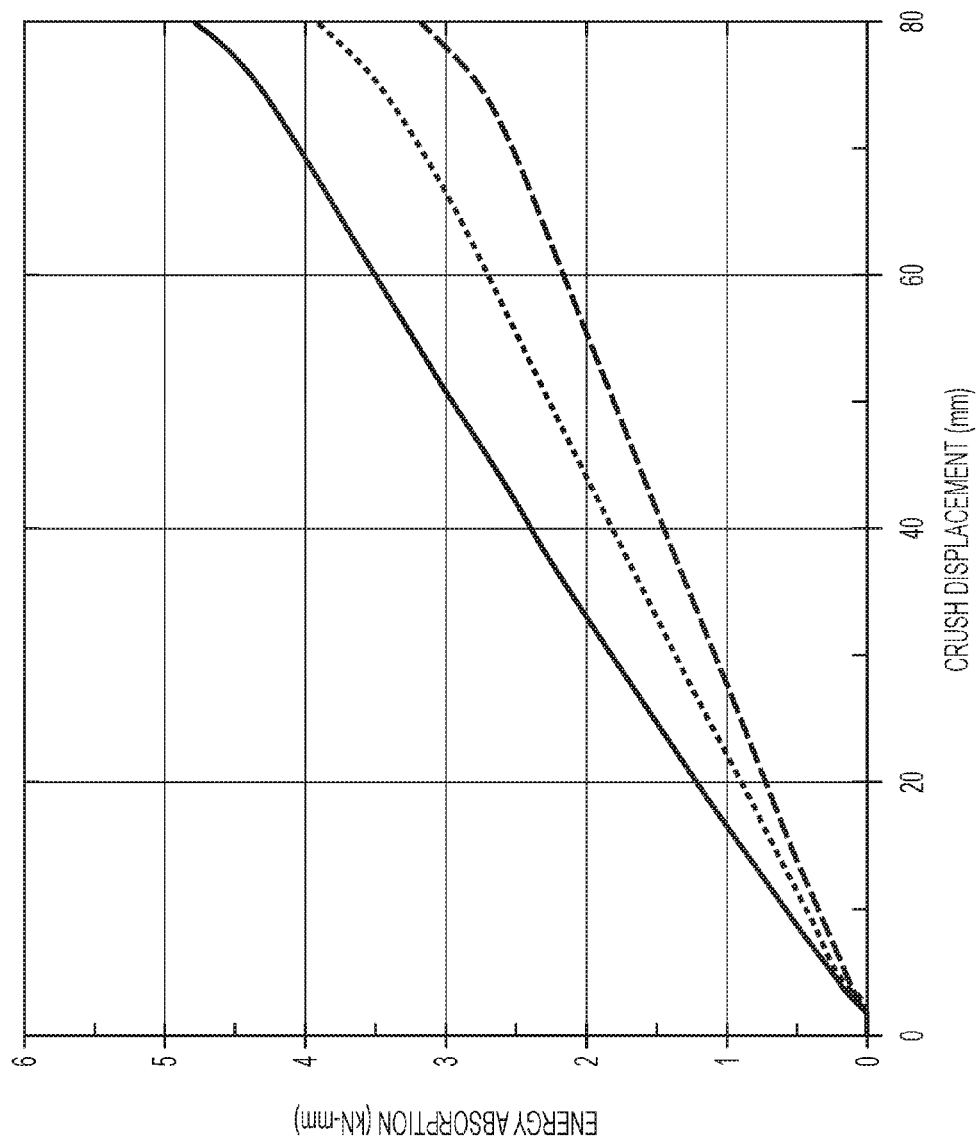
FIG. 14 is a graph of dynamic axial crush energy absorbed and associated axial crush displacement for the exemplary modeled aluminum versions of the structural components shown in FIG. 12.

FIG. 14 graphically portrays the dynamic axial crush energy (in kN-mm) absorbed axially by the modeled aluminum version of exemplary structural components 800, 1000 and 1100, and the associated axial crush displacement (in mm) for the simulated dynamic crush described above. As shown in FIG. 14, the aluminum fourteen-cornered cells of the cellular structure of the structural component 1000 in accordance with the present disclosure could absorb the same total kinetic energy of the impact over a shorter distance as compared the aluminum four-cornered cells of the cellular structures of the structural components 800 and 1100. Specifically, for example, at 60 mm displacement the fourteen-corner-celled aluminum cellular structure of the structural component 1000 accordance with the present disclosure had absorbed about 61.4% more energy as compared to the amount of energy absorbed by the rectangle-celled aluminum cellular structure of the structural component 800 at a displacement of 60 mm. The fourteen-corner-celled aluminum cellular structure of the structural component 1000 accordance with the present disclosure also had absorbed about 29.6% more energy at 60 mm displacement as compared to the amount of energy absorbed by square-celled aluminum cellular structure of the structural component 1100 at a displacement of 60 mm despite the fact that structural component 1100 has a much larger total mass as well as larger lateral dimensions than structural component 1000.

Figure 15:
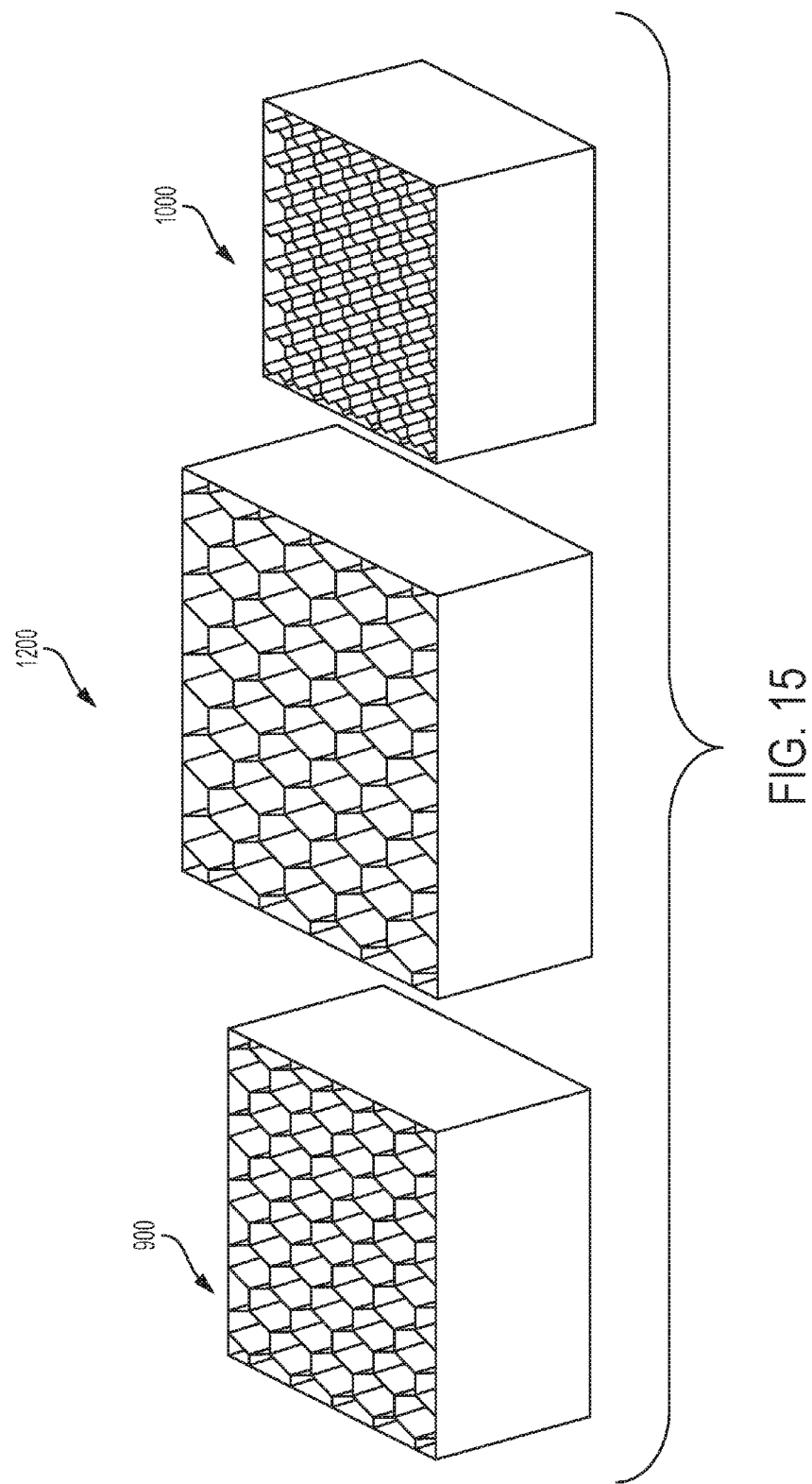
FIG. 15 illustrates various structural components, each component having either a hexagon-celled cellular structure or a fourteen-corner-celled cellular structure.

Additionally, for further comparison, finite element models of structural components with interior cellular structures having interconnected cells with varying shapes (i.e., cross sections) having the same thickness were developed as illustrated in FIG. 15. FIG. 15 shows perspective views of a structural component 900 with an interior cellular structures having interconnected cells with each full cell having a basic, six-cornered cross section (i.e., hexagon shape) (like that of FIG. 8B, as described above), another structural component 1200 with an interior cellular structures having interconnected cells with each full cell having a basic, six-cornered cross section (i.e., hexagon shape), and a structural component 1000 with an interior cellular structures having interconnected cells with each full cell having a fourteen-cornered cross section (like that of FIG. 8C, as described above).

The cellular structure of structural component 900 has 50 hexagon cells, the cellular structure of structural component 1200 has 50 hexagon cells, and the cellular structure of structural component 1000 has 48 fourteen-cornered cells.

The structural components 900 and 1000 have the approximately the same total mass, mass per cell, side thicknesses, and longitudinal length (i.e., length along the z-axis). By virtue of maintaining the total mass, per cell mass, side thicknesses, and total number of cells approximately the same, structural components 900 and 1000 each have varied lateral dimensions (i.e., lengths along the x- and y-axes). In particular, structural component 900 was modeled to have lateral dimensions of 178 mm×178 mm; and structural component 1000 was modeled to have lateral dimensions of 150 mm×150 mm. To provide further comparison, structural component 1200 was modeled to have approximately the same side thickness and longitudinal length, but an increased total mass and mass per cell, and longitudinal length. Accordingly, structural component 1200 has varied lateral dimensions. In particular, structural component 1200 as modeled to have lateral dimensions of 219 mm×219 mm. The longitudinal length of each structural component 900, 1000, and 1200 is 100 mm.

To compare the structural components 900, 1000, and 1200 with interior cellular structures having interconnected cells with varying shapes, exemplary structural components 900, 1000, and 1200 with interior cellular structure were modeled as structurally described above. In the modeling, the cellular structure of the structural components 900, 1000, and 1200 were made of aluminum. Finite element experimental test runs were conducted for the aluminum versions of structural components 900, 1000, and 1200, as shown and described below with reference to FIGS. 16-17. Notably, the aluminum version of cellular structure 1200 shown in FIG. 15 was modeled to have about 31% more mass than the aluminum versions of cellular structures 900 and 1000.

The test runs for each structural component simulated an impact with the same boundary condition, rigid mass (e.g. an impactor), impact speed, and initial kinetic energy.

A dynamic crush of aluminum versions of modeled structural components 900, 1000, and 1200 was simulated. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. Throughout the simulated dynamic crush, the structural component 1000 having an aluminum cellular structure with fourteen-cornered cells in accordance with the present disclosure demonstrated shorter crush displacement than the structural components 900 and 1200 having an aluminum cellular structure with hexagon cells. Also, the fourteen-cornered cells in the structural component 1000 exhibited smaller folding lengths than the hexagon cells in the structural components 900 and 1200, respectively. Additionally, aluminum versions of structural components 900 and 1200 undesirably exhibited more irregular crushing patterns, as evidenced, in particular, by the less concentrated and/or more severe and extensive plastic deformation in lower portions of structural components 900 and 1200.

Figure 16:
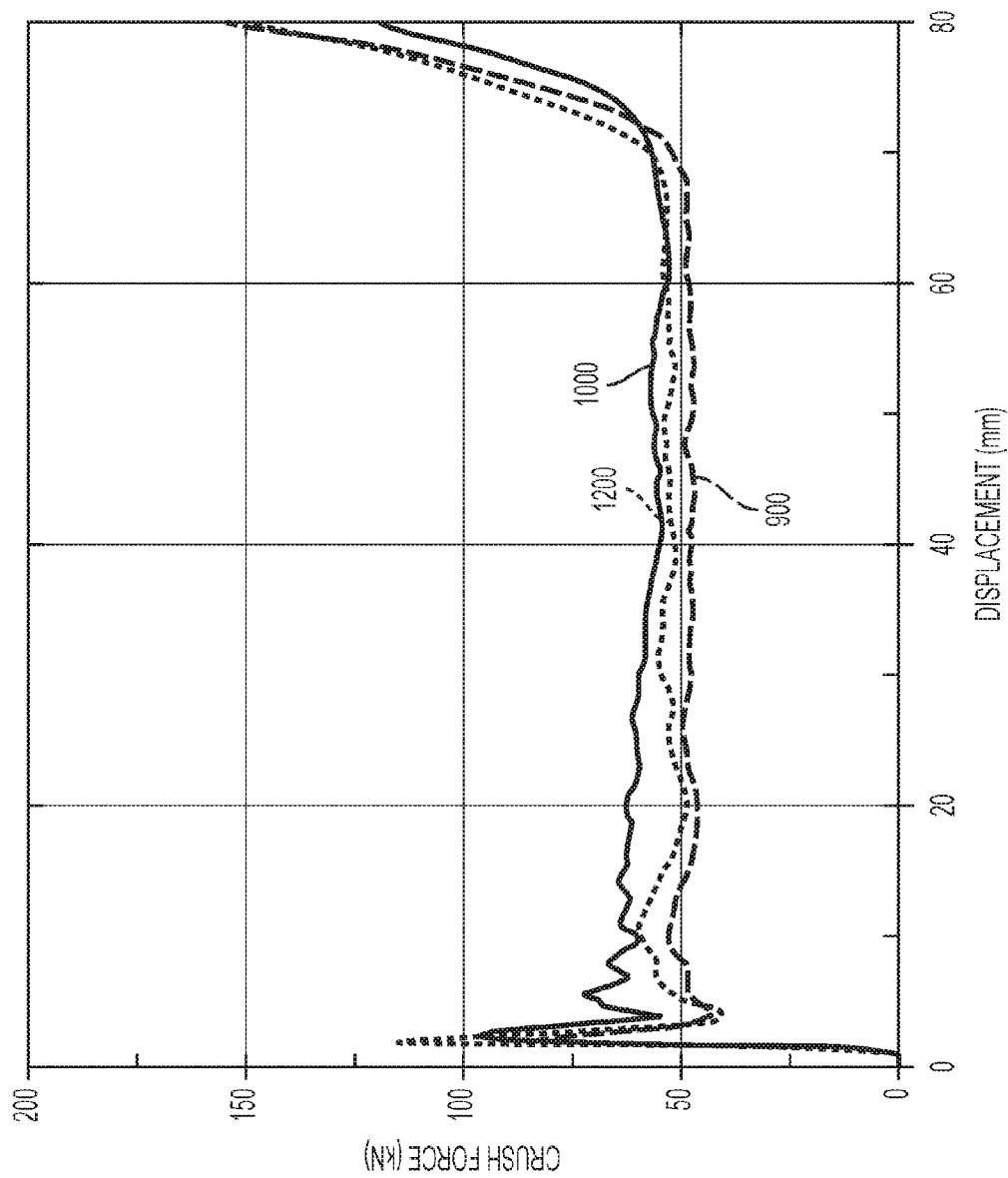
FIG. 16 is a graph of dynamic crush force and associated crush displacement for modeled aluminum versions of the structural components shown in FIG. 15.

FIG. 16 graphically portrays the dynamic crush force (in kN) absorbed axially on the modeled aluminum version of exemplary structural components 900, 1000 and 1200, and the associated axial crush displacement (in mm) for the simulated dynamic crush described above. As shown in FIG. 16, the aluminum fourteen-cornered cells of the cellular structure of the structural component 1000 in accordance with the present disclosure sustained a higher crushing force for a given resulting crushing distance as compared with the aluminum hexagon cells of the cellular structures of the structural components 900 and 1200. Specifically, when averaged over the range of 0 to 60 mm of displacement, the fourteen-corner-celled aluminum cellular structure of the structural component 1000 in accordance with the present disclosure achieved about a 22.6% increase in average crush force as compared with the hexagon-celled aluminum cellular structure of the structural component 900. The fourteen-corner-celled aluminum cellular structure of the structural component 1000 also achieved about a 11.7% increase in average crush force (over the range of 0 to 60 mm displacement) as compared with the hexagon-celled aluminum cellular structure of the structural component 1200 despite the fact that structural component 1200 has a much larger total mass as well as larger lateral dimensions than structural component 1000.

Figure 17:
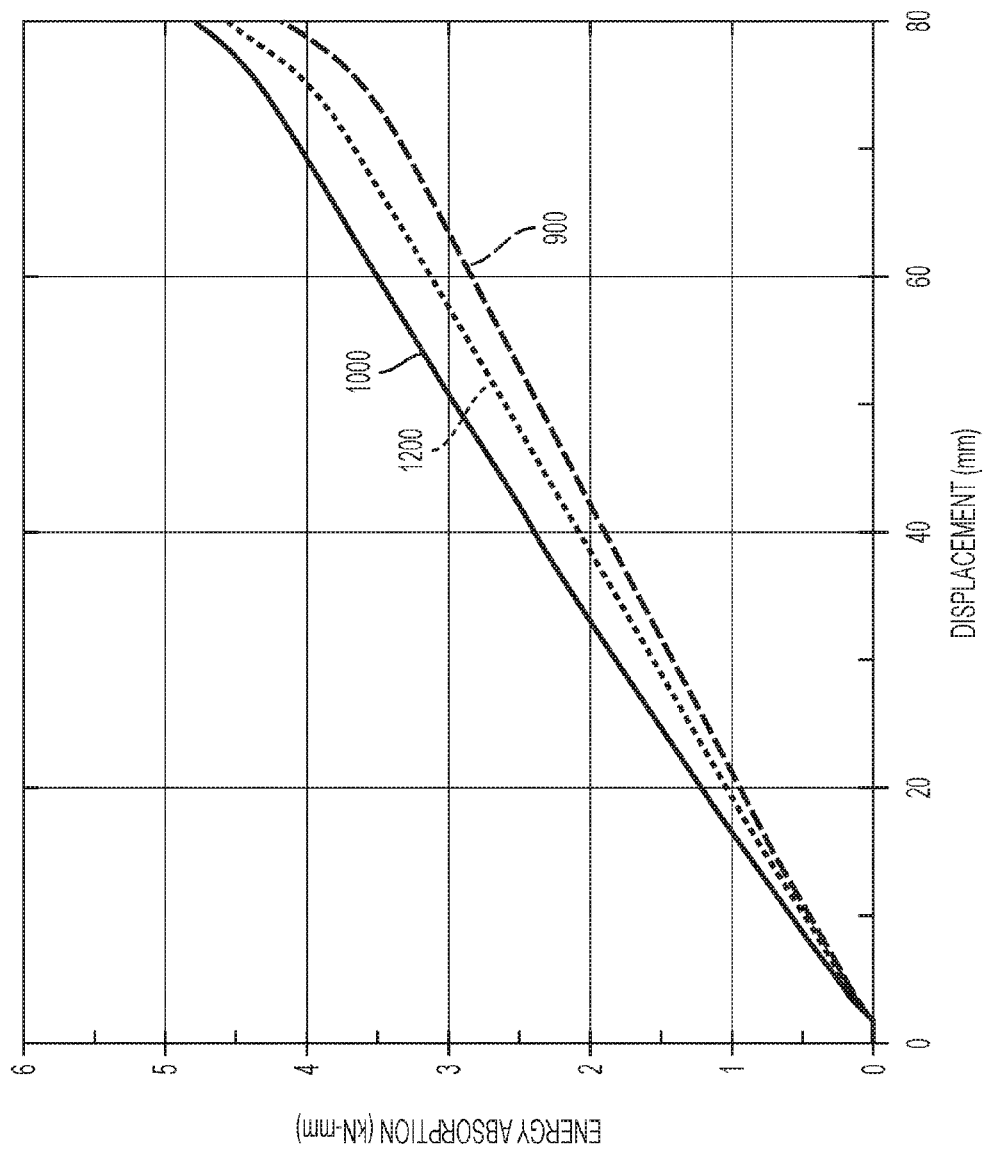
FIG. 17 is a graph of dynamic axial crush energy absorbed and associated axial crush displacement for the exemplary modeled aluminum versions of the structural components shown in FIG. 15.
Figure 18:
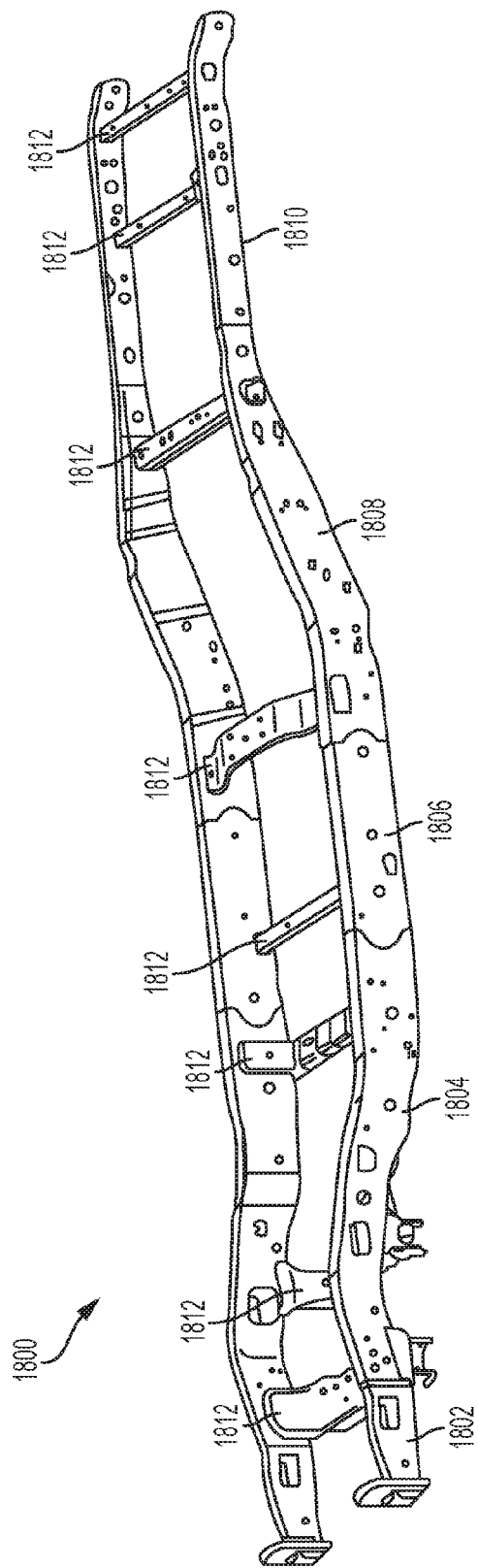
FIG. 18 is a perspective view of an exemplary embodiment of a vehicle frame with several components for which a cellular structure in accordance with the present teachings can be used.

FIG. 17 graphically portrays the dynamic axial crush energy (in kN-mm) absorbed axially by the modeled aluminum version of exemplary structural components 900, 1000 and 1200, and the associated axial crush displacement (in mm) for the simulated dynamic crush described above. As shown in FIG. 18, the aluminum fourteen-cornered cells of the cellular structure of the structural component 1000 in accordance with the present disclosure could absorb the same total kinetic energy of the impact over a shorter distance as compared the aluminum six-cornered cells of the cellular structures of the structural components 900 and 1200. Specifically, for example, at 60 mm displacement the fourteen-corner-celled aluminum cellular structure of the structural component 1000 accordance with the present disclosure had absorbed about 22.6% more energy as compared to the amount of energy absorbed by the hexagon-celled aluminum cellular structure of the structural component 900 at a displacement of 60 mm. The fourteen-corner-celled aluminum cellular structure of the structural component 1000 accordance with the present disclosure also had absorbed about 11.7% more energy at 60 mm displacement as compared to the amount of energy absorbed by hexagon-celled aluminum cellular structure of the structural component 1200 at a displacement of 60 mm despite the fact that structural component 1200 has a much larger total mass as well as larger lateral dimensions than structural component 1000.

Cellular structures having interconnect cells with a fourteen-cornered cross section in accordance with the present teachings may, therefore, allow improved impact and compression energy management over, for example, cellular structures with basic polygonal cellular cross sections, including basic four-cornered and six-cornered polygonal cellular cross sections, while minimizing mass per unit length, provides mass saving solutions that reduce vehicle weight and meet new Corporate Average Fuel Economy (CAFE) and emission standards.

Beyond the increased load carrying and energy absorption capabilities, structural components and cellular structures thereof in accordance with the present teachings may provide additional advantages or benefits such as increased bending energy absorption capacity, improved manufacturing feasibility, reduced elastic and plastic deformation, higher plastic deformation threshold, more locally concentrated plastic deformation, and better fitting of the shape amongst the other components of the complete structure (e.g., vehicle, as noted above).

In addition, a structural component having a cellular structure with interconnected cells having a fourteen-cornered cross section in accordance with the present disclosure also may be tuned to accommodate unique packaging requirements for use in various structures. Incorporation of the cellular structures of the present disclosure within a structural component can also allow for use of a structural component having a peripheral cross section with a basic polygonal shape, such as a circular, oval, triangle, square, or rectangle. By virtue of the particular shape of the peripheral cross section of at least some of the structural components, it may be easier to couple, bond, attach, or otherwise affix other device components to a structural component having a basic polygonal peripheral cross section and an interior cellular structure having cells with a fourteen-cornered cross section in accordance with the present disclosure. Where the structure is a vehicle other structural components can include, but are not limited to, strengthening ribs for casting or molding components, engine and gear box oil pans, transmission cases, intake manifolds, cylinder blocks, strut mounts, engine mounts or transmission mounts.

Structural components and/or cellular structures thereof in accordance with the present teachings are contemplated for use as structural members in a number of environments. For example, in a motor vehicle, (e.g., car, truck, van, ATV, RV, motorcycle, etc.), a structural component and/or cellular structure as disclosed herein is, or is at least a part of, structural member that is a crush can, a bumper, a front horn, a front rail, a front side rail, a rear side rail, a rear rail, a frame cross member, a shotgun, a hinge-pillar, an A-pillar, a B-pillar, a C-pillar, a door beam, a cross car beam, a front header, a rear header, a cow top, a roof rail, a lateral roof bow, a longitudinal roof bow, a body cross member, a back panel cross member, a rocker, an underbody cross member, an engine compartment cross member, a roof panel, a door, a floor, a deck lid, a lift gate, a hood, a rocker, a trim backing stiffener, a battery protective housing, a furniture item, an airless tire, and a body shell. In addition, the present disclosures can be applied to both body-on-frame and unitized vehicles, or other types of structures.

Figure 19:
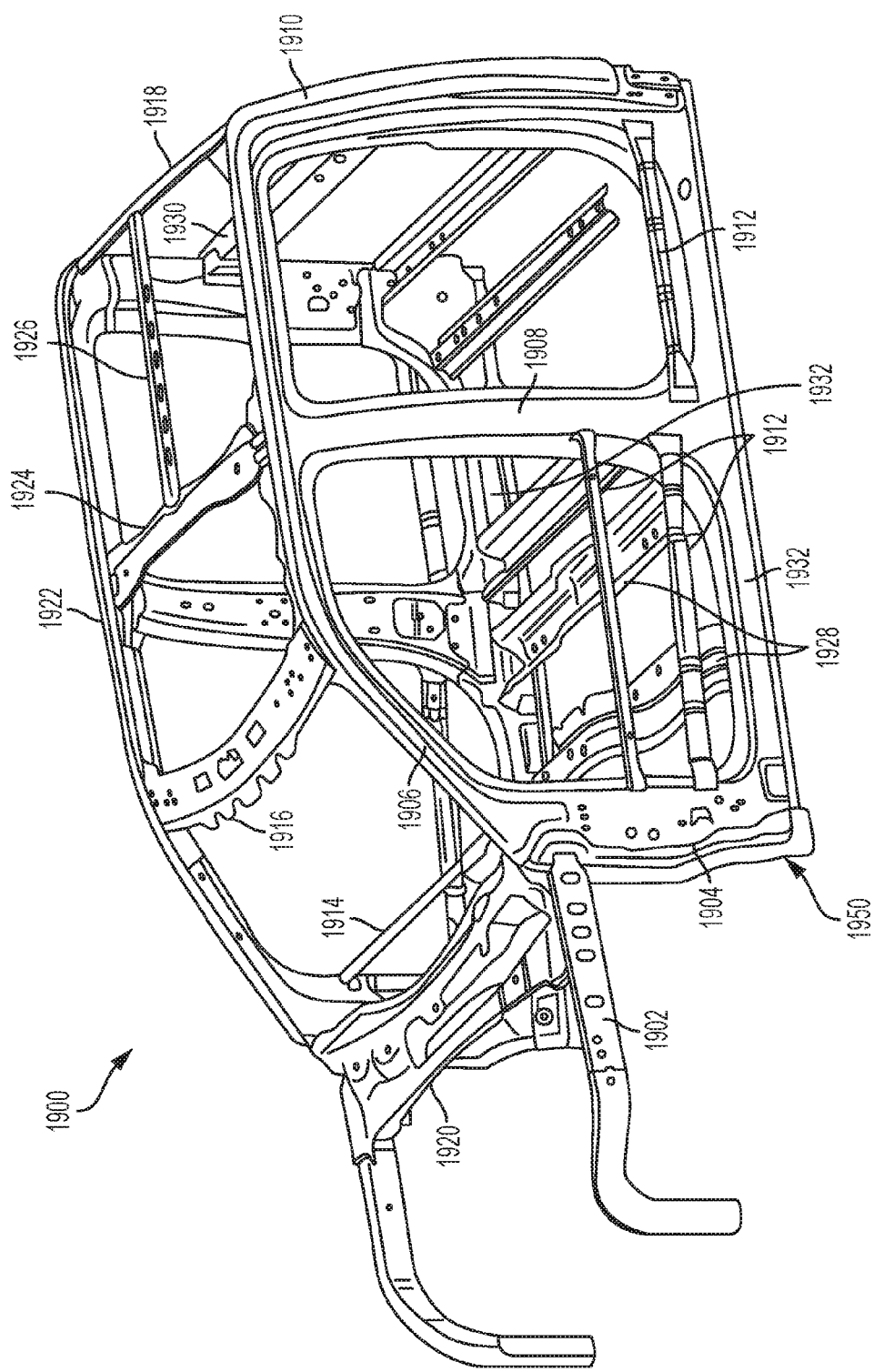
FIG. 19 is a perspective view of an exemplary embodiment of a vehicle upper body with several components for which a cellular structure in accordance with the present teachings can be used.

FIGS. 18 and 19 show an exemplary vehicle frame and an exemplary vehicle upper body, respectively, which have structural members for which structural components having interior cellular structures, or a cellular structure alone, with cells having a fourteen-cornered cross section in accordance with the present disclosure, can be used. FIG. 18 illustrates an exemplary embodiment of a vehicle frame 1800 with several components for which or in which the cellular structures can be used. For example, the cellular structures in accordance with the present disclosure may form or be used as a part of a front horn 1802, a front rail 1804, a front side rail 1806, a rear side rail 1808, a rear rail 1810, and/or as one or more cross members 1812. Likewise, FIG. 19 illustrates an exemplary embodiment of a vehicle upper body 1900 with several components for which or in which the cellular structures can be used. For example, the cellular structures in accordance with the present disclosure may be formed or be used as a part of a shotgun 1902, a hinge-pillar 1904, an A-pillar 1906, a B-pillar 1908, a C-pillar 1910, one or more door beams 1912, a cross car beam 1914, a front header 1916, a rear header 1918, a cow top 1920, a roof rail 1922, a lateral roof bow 1924, longitudinal roof bow 1926, one or more body cross members 1928, a body cross member 1930, and/or rocker 1932.

Moreover, the structural components and/or cellular structures thereof in accordance with the present disclosure may be used as or form a part of vehicle underbody components, for example, as a rocker and/or one or more underbody cross members. Also, the strengthening members in accordance with the present disclosure may be used as or form a part of vehicle engine compartment components, for example, as one or more engine compartment cross members.

Further, cellular structures as disclosed herein may be incorporated into a vehicle structure as a supplement to the frame, a crash can, pillar, door, roof rail, hood, and/or rocker components of a vehicle in the form of an impact energy absorber that is fitted inside, on or around a frame, a crash can, pillar, door, roof rail, hood, and/or a rocker component. For example in a Small Overlap Rigid Barrier (SORB) impact, a cellular structure may be fitted to the outside and/or inside of a front rocker and/or a hinge-pillar to absorb impact energy and to reduce the intrusions to the hinge pillar, rocker, front door, and passenger compartment. In particular, with reference again to FIG. 19, in one exemplary embodiment, a cellular structure in accordance with the present disclosure can be positioned at or adjacent to location 1950 in front of a front end of rocker 1932. For example, a cellular structure can be or be incorporated into a tire blocker and/or body patch (i.e., bracket) positioned at or near location 1950 to absorb impact energy and reduce intrusion by the tire and/or other vehicle components to the hinge pillar 1904, rocker 1932, front door, front dash panel, and passenger compartment. Exemplary tire blocker(s) (e.g., "rear blocker 200") and body patch(es) (e.g., "bracket 100") are shown, for example, in U.S. Pat. No. 9,365,245, which is incorporated herein by reference. The structures disclosed in in U.S. Pat. No. 9,365,245 are intended to be exemplary only, and many other structures can be used as will be understood by to those of skill in the art.

In an oblique or perpendicular side pole impact, the cellular structure may be also fitted to the inside, on or around various components of a vehicle upper body, including a middle rocker, a middle frame, a side door, a B-pillar, or a roof rail, to absorb side impact energy and protect occupants by mitigating the intrusions to the side door and passenger compartment. It is also contemplated that a cellular structure in accordance with the present disclosure may be fitted to the inside, on or around various components of a vehicle frame to absorb side impact energy and mitigate intrusions to the side door and passenger compartment during an oblique or perpendicular impact, such as a side pole impact. For example, with reference again to FIG. 18, it is contemplated that a cellular structure as disclosed herein may be fitted to the inside of a side rail of a vehicle frame, such as, a front side rail 1806 and/or a rear side rail 1808.

In a pedestrian impact, the cellular structure may be part of the hood outer or fitted under the hood as a hood inner to absorb the impact energy and protect the pedestrian. In a frontal impact, the cellular structure may be part of a front rail (a crash can for unitized vehicle) or fitted inside of the front rail (or crash can) to absorb the impact energy, minimize side bending, improve deceleration pulse as well as to reduce the intrusion to the passenger compartment.

Additionally, cellular structures as disclosed herein may be incorporated in interior components of a vehicle. For example, cellular structures may serve as a strengthening backing for a center console, HVAC system and air duct components, bumper trims, bumper energy absorbers, hood inners, grill opening reinforcements, a utility box, arm rests, door trims, pillar trims, lift-gate trims, interior panel trims, instrument panel trims, and head liners.

Depending on the application, cells of embodiments of the present disclosure will have varied shapes (i.e. various cross sections) to accommodate specific cellular structure and structural component space constraints. When used as a vehicle front rail, for example, to achieve optimized axial crush performance, the lengths and/or thicknesses of the sides can be tuned to provide optimal strength, size and shape to meet engine compartment constraints.

Further modifications and alternative embodiments of various aspects of the present teachings will be apparent to those skilled in the art in view of this description.

It is to be understood that the particular examples and embodiments set forth herein are non-limiting, and modifications to structure, dimensions, materials, and methodologies may be made without departing from the scope of the present teachings.

In particular, those skilled in the art will appreciate that a cellular structure may include more than one section or portion, with each section or portion having one or more of the variations of the cellular structures taught in accordance with the present disclosure. Said variation(s) can be made continuously or intermittently along the length of each longitudinal section. In other words, cellular structures that embody combinations of one or more of the above variations to the disclosed tunable parameters, which have not been illustrated or explicitly described, are also contemplated. Additionally, a structural component may include more than one of the cellular structures in accordance with the present disclosure disposed adjacent or spaced apart from one another therein.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiments described herein be considered as exemplary only.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A cellular structure comprising a plurality of cells, each cell of the plurality of cells having a fourteen-cornered cross section comprising fourteen sides and fourteen corners, wherein a shape of each cell of the plurality of cells includes a central portion and four lobes extending outward from the central portion.

2. The cellular structure of claim 1, wherein the fourteen corners comprise ten internal angles and four external angles.

3. The cellular structure of claim 2, wherein:
    each of the ten internal angles ranges from about 60 degrees to about 160 degrees; and
    each of the four external angles ranges from about 60 degrees to about 160 degrees.

4. The cellular structure of claim 2, wherein:
    at least one of the ten internal angles is approximately 120 degrees; and
    at least one of the four external angles is approximately 120 degrees.

5. The cellular structure of claim 4, wherein:
    each of the ten internal angles is approximately 120 degrees; and
    each of the four external angles is approximately 120 degrees.

6. The cellular structure of claim 1, wherein:
    each of the sides of the cross section is substantially straight;
    cross-sectional lengths of the sides of the cross section are each a substantially same length; and
    cross-sectional thicknesses of the sides of the cross section are each a substantially same thickness.

7. The cellular structure of claim 1, wherein:
    four of the sides have a first cross-sectional length;
    ten of the sides have a second cross-sectional length; and
    a ratio of the first cross-sectional length to the second cross-sectional length ranges from about 1:5 to about 5:1.

8. The cellular structure of claim 1, wherein each cell of the plurality of cells further comprises a plurality of walls, each wall of the plurality of walls having a length that extends between longitudinal edges of the respective wall, wherein intersections of the longitudinal edges of the plurality of walls define the fourteen corners of the fourteen-cornered cross section.

9. The cellular structure of claim 6, wherein a ratio of the thickness of the sides to the length of the sides of the cross section ranges from about 1:4 to about 1:10,000.

10. The cellular structure of claim 1, wherein the cellular structure is made from a material selected from the group consisting of steel alloys, titanium alloys, aluminum alloys, magnesium alloys, nylons, polymers, plastics, composites, fiber-reinforced composites, silicone, semiconductor, papers, rubber, foams, gels, woods, corks, shape-memory materials, and combinations thereof.

11. The cellular structure of claim 1, wherein the cellular structure is formed by stamping, bending, press forming, hydro-forming, molding, casting, extrusion, roll forming, machining, forging, 3D printing, or a combination thereof.

12. The cellular structure of claim 1, wherein one or more cells are at least partially filled with a foam material.

13. The cellular structure of claim 1, wherein the cellular structure is configured to be placed within a structural component to enhance at least one of strength, energy absorption, stability of axial crush, and an axial crush distance of the structural component.

14. The cellular structure of claim 1, wherein the plurality of cells share at least one wall.

15. The cellular structure of claim 14, wherein the plurality of cells are interconnected to one another.

16. The cellular structure of claim 1, wherein the cellular structure is, or forms at least a part of, a vehicle structural member selected from the group consisting of:
a crush can, a bumper, a front horn, a front rail, a front side rail, a rear side rail, a rear rail, a frame cross member, a shotgun, a hinge-pillar, an A-pillar, a B-pillar, a C-pillar, a D-pillar, a door beam, a cross car beam, a front header, a rear header, a cow top, a roof rail, a lateral roof bow, a hood, a hood inner, a longitudinal roof bow, a body cross member, a back panel cross member, a rocker, a tire blocker, a body patch, an underbody cross member, an engine compartment cross member, a roof panel, a door, a floor, a deck lid, a lift gate, a trim backing, a battery protective housing, an oil pan, a transmission case, an intake manifold, a cylinder block, a strut mount, an engine mount, a transmission mount, a body shell, and a strengthening rib of a casted or molded component.

17. The cellular structure of claim 1, wherein the cellular structure is, or forms at least a part of, a shipping or packaging component selected from the group consisting of a shipping box, a pallet, and a cushioning member.

18. The cellular structure of claim 1, wherein the cellular structure is, or forms at least a part of, a rotor blade for a turbine.

19. The cellular structure of claim 1, wherein the cellular structure is, or forms at least a part of, a solar energy panel.

20. The cellular structure of claim 1, wherein the cellular structure is, or forms at least a part of, an elongated board sport platform.

21. The cellular structure of claim 1, wherein the cellular structure is, or forms at least a part of, a deformable barrier for vehicle impact testing.

22. The cellular structure of claim 1, wherein the cellular structure is positioned inside a side rail of a frame of an automotive vehicle.

23. A structural component comprising:
at least one wall surrounding a component interior space; and
a first cellular structure positioned within the interior space, wherein the first cellular structure comprises a plurality of cells each having a fourteen-cornered cross section comprising fourteen sides and fourteen corners creating ten internal angles and four external angles, wherein a shape of each cell of the plurality of cells includes a central portion and four lobes, two of the four lobes each comprising three of the ten internal angles and two of the four lobes each comprising two of the ten internal angles.

24. The structural component of claim 23, wherein:
each of the ten internal angles ranges from about 60 degrees to about 160 degrees; and
each of the four external angles ranges from about 60 degrees to about 160 degrees.

25. The structural component of claim 23, wherein:
each of the ten internal angles is approximately 120 degrees; and
each of the four external angles is approximately 120 degrees.

26. The structural component of claim 23, wherein cross-sectional lengths of the sides of the cross section are each a substantially same length and cross-sectional thicknesses of the sides of the cross section are each a substantially same thickness.

27. The structural component of claim 26, wherein a ratio of the thickness of the sides to the length of the sides of the cross section ranges from about 1:4 to about 1:10,000.

28. The structural component of claim 23, further comprising a second cellular structure at least partially overlying or underlying the first cellular structure.

29. The structural component of claim 28, wherein the cross section of each of the cells of the plurality of cells of the first cellular structure have a first shape and a cross section of each of a plurality of cells of the second cellular structure have a second shape.

30. The structural component of claim 29, wherein the first shape and the second shape are different shapes.

31. The structural component of claim 29, wherein each of the first shape and the second shape have fourteen corners and fourteen sides.

32. The structural component of claim 28 further comprising at least one plate between the first cellular structure and the second cellular structure.

33. The structural component of claim 28, further comprising a third cellular structure at least partially overlying or underlying the first cellular structure or the second cellular structure.

34. The structural component of claim 23, wherein the structural component is, or forms at least a part of, a vehicle structural member selected from the group consisting of:
a crush can, a bumper, a front horn, a front rail, a front side rail, a rear side rail, a rear rail, a frame cross member, a shotgun, a hinge-pillar, an A-pillar, a B-pillar, a C-pillar, a D-pillar, a door beam, a cross car beam, a front header, a rear header, a cow top, a roof rail, a lateral roof bow, a hood, a hood inner, a longitudinal roof bow, a body cross member, a back panel cross member, a rocker, a tire blocker, a body patch, an underbody cross member, an engine compartment cross member, a roof panel, a door, a floor, a deck lid, a lift gate, a trim backing, a battery protective housing, an oil pan, a transmission case, an intake manifold, a cylinder block, a strut mount, an engine mount, a transmission mount, a body shell, and a strengthening rib of a casted or molded component.

35. The structural component of claim 23, wherein the structural component is, or forms at least a part of, a shipping or packaging component selected from the group consisting of a shipping box, a pallet, and a cushioning member.

36. The structural component of claim 23, wherein the structural component is, or forms at least a part of, a rotor blade for a turbine.

37. The structural component of claim 23, wherein the structural component is, or forms at least a part of, a solar energy panel.

38. The structural component of claim 23, wherein the structural component is, or forms at least a part of, an elongated board sport platform.

39. The structural component of claim 23, wherein the structural component is, or forms at least a part of, a deformable barrier for vehicle impact testing.

40. The structural component of claim 23, wherein the at least one wall and the plurality of cells are formed unitarily or extruded in one piece.

41. A cellular structure comprising at least two cells, each cell comprising a plurality of longitudinal walls extending between a top and a bottom of the cell, the longitudinal walls intersecting to create corners of the cell, wherein a transverse cross section of the cell comprises ten internal angles and four external angles, wherein the longitudinal walls taper between the top and the bottom of the cell.

42. The cellular structure of claim 41, wherein each of at least four of the internal angles and at least two of the external angles is substantially the same.

43. The cellular structure of claim 41, wherein each cell includes fourteen longitudinal walls.

44. The cellular structure of claim 41, wherein each of the at least two cells share at least one longitudinal wall.

45. The cellular structure of claim 41, wherein the at least two cells are interconnected.

46. The cellular structure of claim 41, wherein each of the at least two cells has a volume configured to receive a filler element.

47. The cellular structure of claim 41, wherein the cellular structure is configured to be positioned within a structural component to enhance at least one of strength, energy absorption, stability of axial crush, and an axial crush distance of the structural component.

48. The cellular structure of claim 41, wherein the cellular structure is, or forms at least a part of, a vehicle structural member selected from the group consisting of:
a crush can, a bumper, a front horn, a front rail, a front side rail, a rear side rail, a rear rail, a frame cross member, a shotgun, a hinge-pillar, an A-pillar, a B-pillar, a C-pillar, a door beam, a cross car beam, a front header, a rear header, a cow top, a roof rail, a lateral roof bow, a hood, a hood inner, a longitudinal roof bow, a body cross member, a back panel cross member, a rocker, a tire blocker, a body patch, an underbody cross member, an engine compartment cross member, a roof panel, a door, a floor, a deck lid, a lift gate, a trim backing, a battery protective housing, an oil pan, a transmission case, an intake manifold, a cylinder block, a strut mount, an engine mount, a transmission mount, a body shell, and a strengthening rib of a casted or molded component.

49. The cellular structure of claim 41, wherein the cellular structure is, or forms at least a part of, a shipping or packaging component selected from the group consisting of a shipping box, a pallet, and a cushioning member.

50. The cellular structure of claim 41, wherein the cellular structure is, or forms at least a part of, a rotor blade for a turbine.

51. The cellular structure of claim 41, wherein the cellular structure is, or forms at least a part of, a solar energy panel.

52. The cellular structure of claim 41, wherein the cellular structure is, or forms at least a part of, an elongated board sport platform.

53. The cellular structure of claim 41, wherein the cellular structure is, or forms at least a part of, a deformable barrier for vehicle impact testing.

54. A sandwich structure comprising:
first and second substantially planar structures; and
a cellular structure positioned between the first and second substantially planar structures, the cellular structure including at least two cells, each cell comprising a plurality of longitudinal walls extending between a top and a bottom of the cell, the longitudinal walls intersecting to create corners of the cell, wherein a transverse cross section of the cell comprises fourteen corners forming a shape with four lobes.

55. The sandwich structure of claim 54, wherein:
the transverse cross section further comprises fourteen sides; and the fourteen sides and fourteen corners are arranged to create ten internal angles and four external angles.

56. The sandwich structure of claim 55, wherein:
each of the ten internal angles is approximately 120 degrees; and
each of the four external angles is approximately 120 degrees.

57. The sandwich structure of claim 55, wherein cross-sectional lengths of the sides of the cross section are each a substantially same length and cross-sectional thicknesses of the sides of the cross section are each a substantially same thickness.

58. The sandwich structure of claim 55, wherein a ratio of a thickness of the sides to a length of the sides of the cross section ranges from about 1:4 to about 1:10,000.

59. The sandwich structure of claim 54, wherein the sandwich structure is a part of a vehicle.

60. The sandwich structure of claim 59, wherein the vehicle is selected from the group consisting of:
an automobile, an RV, an ATV, a motorcycle, a watercraft, an aircraft, a spacecraft, a railway vehicle, a tram vehicle, a high speed rail vehicle, a magnetic levitation vehicle, and a hyperloop capsule or vehicle.

61. The sandwich structure of claim 54, wherein the sandwich structure is, or forms at least a part of, a shipping or packaging component selected from the group consisting of a shipping box, a pallet, and a cushioning member.

62. The sandwich structure of claim 54, wherein the sandwich structure is, or forms at least a part of, a solar energy panel.

63. The sandwich structure of claim 54, wherein the sandwich structure is, or forms at least a part of, an elongated board sport platform.

64. An automotive vehicle comprising:
an upper body comprising a rocker; and
a tire blocker and/or body patch positioned on or adjacent to a front end of the rocker, the tire blocker and/or body patch including a cellular structure comprising a plurality of cells, each cell of the plurality of cells having a fourteen-cornered cross section comprising fourteen sides and fourteen corners.

65. The cellular structure of claim 1, wherein each corner is defined by straight edges of two adjacent sides.

66. The cellular structure of claim 1, wherein two of the four lobes are each defined by four sides of the fourteen-cornered cross section and two of the four lobes are each defined by three sides of the fourteen-cornered cross section.

67. The cellular structure of claim 8, wherein the longitudinal walls taper between a top and a bottom of the cell.

68. The sandwich structure of claim 54, wherein the longitudinal walls taper between the top and the bottom of the cell.

69. The automotive vehicle of claim 64, wherein the sides and corners form a shape with four lobes, two of the four lobes each being defined by four sides of the fourteen-cornered cross section and two of the four lobes each being defined by three sides of the fourteen-cornered cross section.

* * * * *